(12) United States Patent
Fujimoto

(10) Patent No.: US 11,111,394 B2
(45) Date of Patent: Sep. 7, 2021

(54) PRIMER COATING COMPOSITION AND METHOD FOR FORMING COATING FILM

(71) Applicant: NIPPON PAINT AUTOMOTIVE COATINGS CO., LTD., Osaka (JP)

(72) Inventor: Hiromi Fujimoto, Hirakata (JP)

(73) Assignee: NIPPON PAINT AUTOMOTIVE COATINGS CO., LTD., Osaka (JP)

(*) Notice: Subject to any disclaimer, the term of this patent is extended or adjusted under 35 U.S.C. 154(b) by 367 days.

(21) Appl. No.: 16/072,934

(22) PCT Filed: Jan. 26, 2017

(86) PCT No.: PCT/JP2017/002782
§ 371 (c)(1),
(2) Date: Jul. 26, 2018

(87) PCT Pub. No.: WO2017/131104
PCT Pub. Date: Aug. 3, 2017

(65) Prior Publication Data
US 2019/0031887 A1    Jan. 31, 2019

(30) Foreign Application Priority Data

Jan. 27, 2016 (JP) .............................. JP2016-013878

(51) Int. Cl.
*C09D 5/00* (2006.01)
*C09D 163/00* (2006.01)
(Continued)

(52) U.S. Cl.
CPC ............... *C09D 5/002* (2013.01); *B05D 7/14* (2013.01); *B05D 7/24* (2013.01); *C08F 8/20* (2013.01);
(Continued)

(58) Field of Classification Search
None
See application file for complete search history.

(56) References Cited

U.S. PATENT DOCUMENTS

2004/0131895 A1* 7/2004 Hirata .................. B05D 5/00
428/702
2005/0124753 A1   6/2005 Ashihara et al.
(Continued)

FOREIGN PATENT DOCUMENTS

CN    101313020    11/2008
CN    103214904    7/2013
(Continued)

OTHER PUBLICATIONS

Machine Translation of JP 2013/166912 A (Year: 2013).*
(Continued)

*Primary Examiner* — Shamim Ahmed
*Assistant Examiner* — Bradford M Gates
(74) *Attorney, Agent, or Firm* — Wenderoth, Lind & Ponack, L.L.P.

(57) ABSTRACT

The present invention relates to a primer coating composition including an aqueous polyolefin-based resin (A), an aqueous epoxy resin (B), a hydrophilicized-modified carbodiimide compound (C), and an aqueous polyurethane resin (D), in which the aqueous polyolefin-based resin (A) includes an aqueous polypropylene-based resin having a weight-average molecular weight of 50,000 to 200,000, and the hydrophilicized-modified carbodiimide compound (C) is a hydrophilicized-modified carbodiimide compound (C) having a prescribed structure.

11 Claims, 1 Drawing Sheet

(51) Int. Cl.

| | | |
|---|---|---|
| *C09D 175/04* | (2006.01) | |
| *C09D 151/06* | (2006.01) | |
| *C08F 8/20* | (2006.01) | |
| *C09D 123/00* | (2006.01) | |
| *B05D 7/24* | (2006.01) | |
| *B05D 7/14* | (2006.01) | |
| *C08F 255/02* | (2006.01) | |
| *C08G 18/79* | (2006.01) | |
| *C09D 123/26* | (2006.01) | |

(52) U.S. Cl.
CPC .......... *C08F 255/02* (2013.01); *C08G 18/797* (2013.01); *C09D 123/00* (2013.01); *C09D 123/26* (2013.01); *C09D 151/06* (2013.01); *C09D 163/00* (2013.01); *C09D 175/04* (2013.01)

(56) References Cited

U.S. PATENT DOCUMENTS

| | | |
|---|---|---|
| 2008/0032055 A1 | 2/2008 | Ogawa et al. |
| 2014/0162073 A1* | 6/2014 | Grzesiak .............. C08G 18/283 428/422.8 |
| 2016/0280901 A1 | 9/2016 | Ohfuji et al. |

FOREIGN PATENT DOCUMENTS

| | | |
|---|---|---|
| EP | 1 354 911 | 10/2003 |
| EP | 1 995 268 | 11/2008 |
| GB | 2 350 365 | 11/2000 |
| JP | 2001-9357 | 1/2001 |
| JP | 2003-201442 | 7/2003 |
| JP | 2004-115712 | 4/2004 |
| JP | 2007-2117 | 1/2007 |
| JP | 2008-31453 | 2/2008 |
| JP | 2011-137080 | 7/2011 |
| JP | 2013166912 A * | 8/2013 |
| SG | 192343 | 8/2013 |
| WO | 2007/061081 | 5/2007 |
| WO | 2015/083721 | 6/2015 |

OTHER PUBLICATIONS

Extended European Search Report dated Aug. 27, 2019 in corresponding European Patent Application No. 17744334.8.
International Search Report (ISR) dated Apr. 11, 2017 in International (PCT) Application No. PCT/JP2017/002782.
International Preliminary Report on Patentability dated Aug. 9, 2018 in International Application No. PCT/JP2017/002782.
Office Action dated Mar. 19, 2020 in corresponding Chinese Patent Application No. 201780020493.7 with English language translation.

* cited by examiner

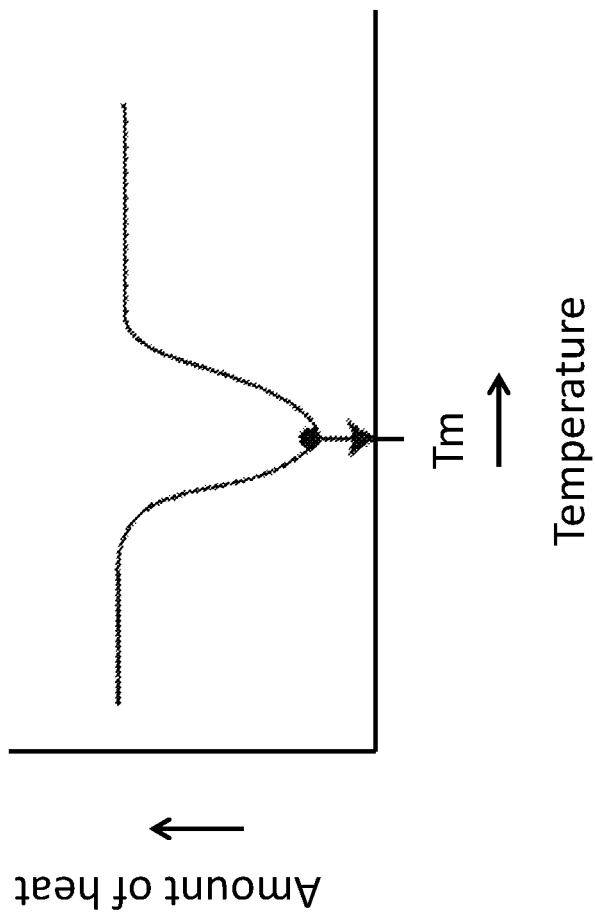

PRIMER COATING COMPOSITION AND METHOD FOR FORMING COATING FILM

TECHNICAL FIELD

The present invention relates to a primer coating composition and a method for forming a coating film using the same.

BACKGROUND ART

On the surface of an object to be coated such as an automobile body is formed sequentially a plurality of coating films having various roles, and thus the object to be coated is protected and concurrently is provided with a beautiful appearance and an excellent design. As one example for a method for forming such a plurality of coating films on such as a steel plate, there is a method in which an undercoating film such as an electrodeposition coating film is formed on an object to be coated that is excellent in conductivity. Then, in the method, a primer coating film, an intermediate coating film, a base coating film, and a clear coating film are formed thereon one after another.

In view of further request for reducing burden on the environment such as energy saving and reduction in $CO_2$ emission, it is required to lower a heating temperature in a coating film formation. Moreover, in automobile manufacturing fields, further reduction in weight of an automobile body is required according to the development of electric vehicles. The reduction in weight of an automobile body brings about an improvement in fuel economy, and therefore, it is also effective in terms of energy saving and reduction in $CO_2$ emission. One way to reduce the weight of an automobile body is to replace a steel plate part with a resin part.

In conventional coating for steel plates and resin members, it is common that different coating compositions are used in consideration of the characteristics and softening temperature of each member. Moreover, in a coating composition of automobile bodies, for the purposes of simplifying coating step and coating management and improving hue consistency in a coated product, it has been demanded to commonize coating compositions to be used for coating various components.

For example, resin members to be used for automobile bumpers, moldings, and the like generally have poor wettability and are poor in adhesion and the like to coating compositions. In particular, when the resin member is made of a polypropylene resin or the like, such a resin is chemically inert and therefore the adhesion between a top coating composition and the resin material is poor. For this reason, it has been generally conducted to apply a primer coating composition for a resin member before the application of a top coating composition (see Patent Document 1).

However, when a primer coating composition to be used for a resin member is used for a steel plate, the adhesion between the primer coating film and the steel plate or an electrodeposition coating film is extremely low and therefore it has not been able to commonize coating compositions to be used for coating of various constituent parts.

Moreover, in the case of commonizing the coating compositions, e.g., primer coating compositions to be used for a steel plate and a resin member, it is necessary to adjust the coating film formation temperature of the coating composition to a temperature lower than the conventional coating film formation temperature in consideration of the heat resistance of the resin member. Furthermore, in the case of forming a coating film on an object to be coated having both a steel plate part and a resin part, deformation may occur due to a difference between the thermal expansion coefficients of the members in heating during the coating film formation. Therefore, it is extremely important to lower the coating film formation temperature and minimize the influence of the thermal history on each member in the common use of a coating composition, for example, a primer coating composition.

In addition, moisture resistance is also required for a coating film such as a primer coating film.

PRIOR ART DOCUMENT

Patent Document

Patent Document 1: JP-A-2007-2117

SUMMARY OF THE INVENTION

Problem to be Solved by the Invention

However, there has not yet been provided a coating composition capable of forming a coating film that exhibits good adhesion to both a steel plate and a resin member and that exhibits good water resistance.

In view of the above current situations, it is an object of the present invention to provide a primer coating composition capable of forming a primer coating film that has excellent adhesion to both a steel plate and a resin member and further has excellent moisture resistance. In addition, another object of the present invention is to provide a method for forming a coating film using a primer coating composition having such characteristics.

Means of Solving the Problem

The present invention provides the following aspects to solve the aforementioned problems.

[1]

A primer coating composition comprising an aqueous polyolefin-based resin (A), an aqueous epoxy resin (B), a hydrophilicized-modified carbodiimide compound (C), and an aqueous polyurethane resin (D), wherein the aqueous polyolefin-based resin (A) includes an aqueous polypropylene-based resin having a weight-average molecular weight of 50,000 to 200,000, and the hydrophilicized-modified carbodiimide compound (C) is a compound represented by a formula (I), (II), or (III) below:

[Chemical Formula 1]

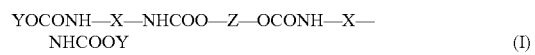

wherein Xs are each a bifunctional organic group having at least one carbodiimide group, Ys are identical or different structures each resulting from elimination of a hydroxyl group from a polyalkylene glycol monoalkyl ether, and Z is a structure resulting from elimination of a hydroxyl group from a bifunctional polyol having a number-average molecular weight of 200 to 5,000,

[Chemical Formula 2]

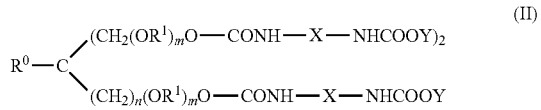

wherein Xs are each a bifunctional organic group having at least one carbodiimide group, Ys are identical or different structures each resulting from elimination of a hydroxyl group from a polyalkylene glycol monoalkyl ether, $R^0$ is hydrogen, a methyl group or an ethyl group, $R^1$s are each an alkylene group having 4 or less carbon atoms, n is 0 or 1, and each m is 0 to 60,

[Chemical Formula 3]

wherein X is a bifunctional organic group having at least one carbodiimide group, and Ys are identical or different structures each resulting from elimination of a hydroxyl group from a polyalkylene glycol monoalkyl ether.

[2]

The primer coating composition according to [1], wherein a content of the aqueous polyolefin-based resin (A) is 15 to 60 parts by mass based on 100 parts by mass of a resin solid content of the primer coating composition.

[3]

The primer coating composition according to [1] or [2], wherein a content of the hydrophilicized-modified carbodiimide compound (C) is 3 to 10 parts by mass based on 100 parts by mass of the resin solid content of the primer coating composition.

[4]

The primer coating composition according to any one of [1] to [3], wherein the hydrophilicized-modified carbodiimide compound (C) represented by the formula (III) above is a compound defined below:

[Chemical Formula 4]

wherein X is a bifunctional organic group having at least one carbodiimide group, and Ys are identical or different structures selected from (i) or (ii) below:
(i) a structure resulting from elimination of a hydroxyl group from a polyethylene glycol monoalkyl ether in which an alkyl group having 1 to 3 carbon atoms is ether-linked to an end of a polyethylene oxide unit having a repeat number of 6 to 20,
(ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60.

[5]

The primer coating composition according to [4], wherein in the hydrophilicized-modified carbodiimide compound (C) represented by the formula (III) above, one Y is (i) and another Y is (ii), and
a ratio of the structure (i) to the structure (ii) is within a range of (i):(ii)=1:0.7 to 1:8.

[6]

The primer coating composition according to any one of [1] to [5], wherein the aqueous polyurethane resin (D) has a glass transition point (Tg) of −50° C. or less, and a cured film of the aqueous polyurethane resin (D) has an elongation at break of 400% or more at −20° C.

[7]

The primer coating composition according to any one of [1] to [6], wherein a content of the aqueous polyurethane resin (D) is 15 parts by mass or more based on 100 parts by mass of the resin solid content of the primer coating composition.

[8]

The primer coating composition according to any one of [1] to [6], wherein a content of the aqueous polyurethane resin (D) is 25 parts by mass or more and 45 parts by mass or less based on 100 parts by mass of the resin solid content of the primer coating composition.

[9]

The primer coating composition according to any one of [1] to [7], wherein a content of the aqueous epoxy resin (B) is 20 parts by mass or more and 50 parts by mass or less based on 100 parts by mass of the resin solid content of the primer coating composition.

[10]

A method for forming a coating film, the method comprising a step of applying the primer coating composition according to any one of [1] to [9] to an object to be coated, and heating the primer coating composition to 70 to 120° C. to form a primer coating film.

[11]

The method for forming a coating film according to [10], further comprising a step of forming at least one coating film selected from an intermediate coating film, a base coating film and a clear coating film on the primer coating film.

[12]

The method for forming a coating film according to [10] or [11], wherein the object to be coated includes a steel plate part and a resin part.

Effects of the Invention

The primer coating composition of the present invention can form a coating film that exhibits good adhesion to both a steel plate and a resin member and exhibits good water resistance. In addition, the primer coating composition of the present invention provides a coating film having excellent chipping resistance.

BRIEF DESCRIPTION OF DRAWING

FIG. 1 is a diagram that illustrates a chart during temperature raising in DSC measurement.

DESCRIPTION OF THE EMBODIMENTS

The primer coating composition of the present invention is a primer coating composition comprising a prescribed aqueous polyolefin-based resin (A), an aqueous epoxy resin (B), a hydrophilicized-modified carbodiimide compound (C), and an aqueous polyurethane resin (D). By comprising the primer coating composition of the present invention having such a combination, it is possible to provide a multilayer coating film having excellent moisture resistance, excellent water-shrinkage resistance and water-resistant adhesion. In the present description, the term "multilayer coating film" refers to a coating film having, in addition to a primer layer formed from the primer coating composition of the present invention, at least one layer of coating film selected from an intermediate coating film, a base coating film, and a clear coating film.

Furthermore, the primer coating composition of the present invention can improve the hydrophobicity of a primer coating film obtained and can exhibit better adhesion to both a steel plate and a resin member. Therefore, the primer coating composition of the present invention can form a coating film that exhibits better water resistance and better moisture resistance.

Moreover, for example, by including the hydrophilicized-modified carbodiimide compound (C), the primer coating composition of the present invention can provide a primer coating film excellent in interlayer adhesion and water resistance even when it is not subjected to a thermal history exceeding 120° C. during formation of a multilayer coating film. Therefore, the heating temperature to be applied during the formation of a coating film can be lowered and reduction in burden on the environment such as energy saving and reduction in $CO_2$ emission can be achieved.

In addition, since the primer coating film exhibits better adhesion to both a steel plate and a resin member as described above, it is possible to facilitate the replacement of steel plate parts with resin parts in automobile bodies.

Moreover, for example, by including the hydrophilicized-modified carbodiimide compound (C), the primer coating composition of the present invention can provide a primer coating film excellent in interlayer adhesion and water resistance even when it is not subjected to a thermal history exceeding 120° C. during formation of a multilayer coating film as described above. Therefore, the occurrence of deformation due to a difference between the thermal expansion coefficients of members can be suppressed in heating during the coating film formation, and the influence of the thermal history to the members can be minimized.

In particular, the hydrophilicized-modified carbodiimide compound (C) according to the present invention can be presumed to form crosslinks with a carboxylic acid functional group of the aqueous polyurethane resin (D), which is a component constituting a primer coating film and/or to form crosslinks with a carboxylic acid functional group included in a constituent resin of an intermediate coating film forming composition to be applied onto a primer coating film or an object coated with a primer coating composition. Such crosslinking is expected to reduce the hydrophilicity of a carboxylic acid functional group and enhance the water resistance of a multilayer coating film, and the formation of crosslinks may be expected to enhance attaching force.

The primer coating composition of the present invention can contain an aqueous polyurethane resin (D) having a glass transition point (Tg) of −50° C. or less, in which a cured film of the aqueous polyurethane resin (D) has an elongation at break of 400% or more at −20° C.

For example, a mass ratio of a content of the hydrophilicized-modified carbodiimide compound (C) to a content of the aqueous polyurethane resin (D) in the primer coating composition is preferably (C):(D)=0.06:1 to 0.45:1, and more preferably 0.06:1 to 0.30:1.

By comprising of the hydrophilicized-modified carbodiimide compound (C) and the aqueous polyurethane resin (D) in such a range, a coating film having better moisture-resistant adhesion and better chipping resistance can be formed.

The primer coating composition of the present invention contains, for example, an aqueous polyurethane resin (D) having a glass transition point (Tg) of −50° C. or less, in which a cured film of which has an elongation at break of 400% or more at −20° C. By inclusion of the aqueous polyurethane resin (D) and the hydrophilicized-modified carbodiimide compound (C), it is possible to obtain a primer coating film having better moisture resistance, better water-shrinkage resistance, and better water-resistant adhesion.

In addition, a coating film formed from the primer coating composition of the present invention having such a combination has further improved hydrophobicity, so that it exhibits better adhesion to both a steel plate and a resin member. For this reason, the primer coating composition can form a coating film that exhibits better water resistance and better moisture resistance even when it has been applied to both a steel plate and a resin member.

The primer coating composition of the present invention having such a combination can provide a primer coating film excellent in interlayer adhesion and water resistance even when it is not subjected to a thermal history exceeding 120° C. during formation of a multilayer coating film. Therefore, the heating temperature to be applied during the formation of the coating film can be lowered, and reduction in burden on the environment such as energy saving and reduction in $CO_2$ emission can be achieved.

Moreover, since the primer coating film exhibits better adhesion to both a steel plate and a resin member as described above, it is possible to facilitate the replacement of steel plate parts with resin parts in automobile bodies.

In addition, the primer coating composition of the present invention can provide a primer coating film excellent in interlayer adhesion and water resistance as described above even when it is not subjected to a thermal history exceeding 120° C. during formation of a multilayer coating film. Therefore, the occurrence of deformation due to a difference between the thermal expansion coefficients of members can be suppressed in heating during the coating film formation, and the influence of the thermal history to the members can be minimized.

In addition, a primer coating film formed from the primer coating composition of the present invention containing the hydrophilicized-modified carbodiimide compound (C) and the above-specified aqueous polyurethane resin (D) can exhibit better chipping resistance.

In particular, the hydrophilicized-modified carbodiimide compound (C) according to the present invention can form crosslinks when the aqueous polyurethane resin (D) has a carboxylic acid functional group. It is presumed that due to such crosslinking, the hydrophilicity of the primer coating film is lowered and the affinity to water is lowered, and as a result, the water resistance is improved. It is also presumed that interlayer adhesion between layers in the multilayer coating film is improved by crosslinking with the hydrophilicized-modified carbodiimide compound (C) according to the present invention, so that the water resistance and the moisture resistance may be improved.

Each of the compositions included in the present invention will be described below.

<Aqueous Polyolefin-Based Resin (A)>

The primer coating composition of the present invention contains an aqueous polyolefin-based resin (A). In the present invention, the aqueous polyolefin-based resin (A) includes an aqueous polypropylene-based resin. Preferably, the aqueous polyolefin-based resin (A) is an aqueous polypropylene-based resin.

The aqueous polypropylene-based resin includes a resin having at least a propylene structural unit. For example, the aqueous polypropylene-based resin may be composed of a resin having a propylene structural unit, or may be a blend of a resin having a propylene structural unit and a resin having no propylene structure. In the blend embodiment, it is required that the resin having no propylene structure is blended as long as the characteristics of the resin having a propylene structural unit are not impaired.

The aqueous polyolefin-based resin (A) is preferably an aqueous polypropylene-based resin in which 90% by mass or more of its constituent monomers is propylene.

In the aqueous polypropylene-based resin, the resin having no propylene structure to be used in combination with the resin having a propylene structural unit is preferably an olefin-based resin. Examples of an olefin-based resin include homopolymers and copolymers of olefin selected from ethylene, butene, 3-methyl-1-butene, 3-methyl-1-heptene, etc.; and copolymers of the olefin with vinyl acetate, butadiene, an acrylic ester, a methacrylic ester, etc. The resin having no propylene structure may be appropriately modified.

The aqueous polyolefin-based resin (A) may include at least one selected from an aqueous non-chlorinated polyolefin-based resin (may be referred to as (A-1)), an aqueous chlorinated polyolefin-based resin (may be referred to as (A-2)), and a combination thereof.

The aqueous non-chlorinated polyolefin-based resin (A-1) may include, for example, an aqueous non-chlorinated polypropylene-based resin. Preferably, the aqueous non-chlorinated polyolefin-based resin (A-1) is an aqueous non-chlorinated polypropylene-based resin.

The aqueous chlorinated polyolefin-based resin (A-2) may include, for example, an aqueous chlorinated polypropylene-based resin. Preferably, the aqueous chlorinated polyolefin-based resin (A-2) is an aqueous chlorinated polypropylene-based resin.

The aqueous non-chlorinated polypropylene-based resin and the aqueous chlorinated polypropylene-based resin each may be composed of a resin having a propylene structural unit. In a certain embodiment, the aqueous non-chlorinated polypropylene-based resin and the aqueous chlorinated polypropylene-based resin each may be a blend of a resin having a propylene structural unit and the above-described resin having no propylene structure.

The aqueous polyolefin-based resin may be a modified product, and as the modified product of the aqueous polyolefin-based resin, a modified product prepared by adding an unsaturated carboxylic acid (or the anhydride thereof) to the aqueous polyolefin-based resin can be suitably used. Examples of the unsaturated carboxylic acid (or the anhydride thereof) include maleic acid (or maleic anhydride), fumaric acid, itaconic acid (or itaconic anhydride), and (meth)acrylic acid. The modified product may be usually prepared by reacting a polyolefin with an unsaturated carboxylic acid (or the anhydride thereof) in the presence of an organic peroxide or the like.

The chlorination of the aqueous polyolefin-based resin or its modified product is usually carried out by dissolving under heat a polyolefin or its modified product in a chlorine-containing solvent such as carbon tetrachloride, and reacting the resulting solution while chlorine gas is blown at a temperature of 50 to 120° C., so that a chlorination ratio may be attained at 50% or less, preferably 10 to 45%, and more preferably 20 to 40%.

A weight-average molecular weight of the aqueous polyolefin-based resin or the modified product thereof or chlorinated products thereof is about 2,000 to 300,000, and specifically 50,000 to 200,000. For example, the weight-average molecular weight may be about 50,000 to 120,000.

A content of the aqueous polyolefin-based resin described below is, for example, 15 to 60 parts by mass, and preferably 20 to 40 parts by mass, based on 100 parts by mass of a resin solid content of the primer coating composition. When the content is less than 15 parts by mass, poor adhesion with a substrate due to the lack of adhesion points may occur. When the content exceeds 60 parts by mass, poor adhesion with a top coating film (a base coating film) due to polarity difference may occur. Incidentally, when a plurality of types of aqueous polyolefin-based resins are comprised, for example, when an aqueous chlorinated polyolefin-based resin and an aqueous non-chlorinated polyolefin-based resin are comprised in combination, the total amount of these aqueous polyolefin-based resins can be adjusted to fall within the above range.

(Aqueous Chlorinated Polyolefin-Based Resin)

Examples of an aqueous chlorinated polyolefin-based resin include an aqueous chlorinated polyethylene resin, an aqueous chlorinated polypropylene resin, an aqueous chlorinated ethylene-propylene copolymer, and an aqueous chlorinated ethylene-vinyl acetate copolymer. The aqueous chlorinated polyolefin-based resin includes at least a resin having a propylene structural unit such as an aqueous chlorinated polypropylene resin and an aqueous chlorinated ethylene-propylene copolymer.

A resin prepared by graft polymerizing a polymerizable monomer to an aqueous chlorinated polyolefin-based resin is also included in the aqueous chlorinated polyolefin-based resin. Examples of the polymerizable monomer include alkyl esters of (meth)acrylic acid, alkoxyalkyl of (meth)acrylic acid, glycidyl (meth)acrylate, adducts of glycidyl (meth)acrylate and monocarboxylic acid, hydroxyalkyl (meth)acrylate, acrylic acid, methacrylic acid, maleic acid, and fumaric acid.

An amount of the polymerizable monomer to be used is preferably, for example, 90 to 10% by mass, and especially to 30% by mass, based on the total amount of the polymerizable monomer and the aqueous chlorinated polyolefin-based resin. The aqueous chlorinated polyolefin-based resin may have a functional group such as a hydroxyl group or a carboxyl group in its molecule.

For example, a maleated chlorinated polyolefin polymer can be synthesized by introducing maleic anhydride into an aqueous chlorinated polyolefin-based resin, so that adhesion of the composition to a plastic material can be improved.

(Acid-Modified Chlorinated Polyolefin-Based Resin)

An acid-modified chlorinated polyolefin-based resin is, for example, an aqueous polyolefin derivative containing an aqueous chlorinated polyolefin moiety and an acid anhydride moiety bonded to the aqueous chlorinated polyolefin moiety. When containing an acid anhydride moiety, the acid-modified chlorinated polyolefin-based resin may be referred to as an acid anhydride-modified chlorinated polyolefin.

The aqueous chlorinated polyolefin moiety is a moiety composed of polyolefin substituted with a chlorine atom. The acid anhydride moiety is a modified moiety that contains a group derived from an acid anhydride such as maleic anhydride, citraconic anhydride, or itaconic anhydride, and that is obtained by graft polymerization. The acid anhydride moiety may be a moiety having a group or groups derived from one or more types of acid anhydrides. The acid-modified chlorinated polyolefin-based resin is a resin prepared by reacting a polyolefin with an acid anhydride and chlorine to cause internal modification of the polyolefin, and for example, the acid-modified chlorinated polyolefin-based resin is produced by reacting a polyolefin with chlorine and an acid anhydride. Here, any of chlorine or the acid anhydride may be first reacted with the acid-modified chlorinated polyolefin-based resin. The reaction with chlorine is carried out, for example, by introducing chlorine gas into a solution containing a polyolefin. The reaction with the acid anhydride is carried out, for example, by reacting a polyolefin (or a chlorinated polyolefin) with the acid anhydride in the presence of a peroxide.

Examples of the polyolefin which can be used for the acid-modified chlorinated polyolefin-based resin may include polyethylene, polypropylene, polybutene; copolymers such as ethylene-propylene copolymers, ethylene-propylene-diene copolymers and styrene-butadiene-isoprene copolymers; and polymers obtained by polymerizing at least one monomer selected from ethylene, propylene and alkenes having 8 or less carbon atoms. These may be used singly or two or more thereof may be used in combination. In the present invention, the acid-modified chlorinated polyolefin-based resin preferably contains a polypropylene structural unit from the viewpoint of ease of availability and high adhesion. In a certain embodiment, the acid-modified chlorinated polyolefin-based resin is an acid-modified chlorinated polypropylene-based resin. Examples of the acid anhydride to be used for the modification include maleic anhydride, citraconic anhydride, and itaconic anhydride.

A chlorine content of the acid-modified chlorinated polyolefin-based resin is preferably 10 to 30% by mass, and more preferably 18 to 22% by mass. When the chlorine content is less than 10% by mass, the solubility in a solvent may tend to lower and the emulsification of the resin may tend to be difficult. On the other hand, when the chlorine content exceeds 30% by mass, the adhesion of the composition to a plastic material such as polypropylene may deteriorates and may be insufficient.

An acid anhydride content of the acid-modified chlorinated polyolefin-based resin is preferably in the range of 1 to 10% by mass, and more preferably in the range of 1.2 to 5% by mass. When the acid anhydride content is less than 1% by mass, the resin may be difficult to be emulsified and the stability of the primer coating composition may deteriorate. On the other hand, when the acid anhydride content exceeds 10% by mass, the number of acid anhydride groups may tend to be extremely large and the water resistance may tend to deteriorate.

A weight-average molecular weight of the acid-modified chlorinated polyolefin-based resin is in the range of 50,000 to 200,000, and more preferably in the range of 50,000 to 120,000. When the weight-average molecular weight is less than 50,000, the strength of a primer coating film obtained from the primer coating composition of the present invention may tend to decrease and the adhesion may tend to lower. On the other hand, when the weight-average molecular weight exceeds 200,000, the viscosity may tend to be high and the resin may tend to be difficult to be emulsified.

In the present invention, the acid-modified chlorinated polyolefin-based resin exhibits dispersibility in water. For example, the acid-modified chlorinated polyolefin-based resin has high hydrophobicity and may be difficult to be stably dispersed in water. For example, it is preferable that the acid-modified chlorinated polyolefin-based resin is emulsified using an emulsifier or a neutralizing agent and then may be used as an emulsion resin.

A blending ratio of the emulsifier is appropriately set depending on the blending ratios of the acid-modified chlorinated polyolefin-based resin, the neutralizing agent and water. For example, it is preferably 2 to 50% by mass, and more preferably 5 to 30% by mass, based on 100% by mass of the acid-modified chlorinated polyolefin-based resin. When the blending ratio of the emulsifier is less than 2% by mass, the storage stability of the emulsion may deteriorate and aggregation or sedimentation easily may tend to occur in the course of polymerization in the step of producing the emulsion described below. On the other hand, when the blending ratio exceeds 50% by mass, a large amount of the emulsifier may remain in a coating film, and the water resistance and weather resistance of the coating film may tend to deteriorate.

The emulsifier is not particularly limited, and examples thereof include nonionic emulsifiers such as polyoxyethylene alkyl ethers including polyoxyethylene lauryl ether and polyoxyethylene stearyl ether, polyoxyethylene alkylphenol ethers including polyoxyethylene nonylphenol ether, polyoxyethylene aliphatic esters, polyoxyethylene polyhydric alcohol fatty acid esters, polyhydric alcohol fatty acid esters, polyoxyethylene propylene polyols, and alkylol amides. In addition, the example of emulsifier includes anionic emulsifiers such as alkyl sulfates, dialkyl sulfosuccinates, alkyl sulfonates, polyoxyethylene stearyl ether sulfates, polyoxyethylene nonylphenyl ether sulfates, and alkyl phosphates. Furthermore, the example of emulsifier includes amphoteric emulsifiers such as alkyl betaines including stearylbetaine and laurylbetaine, and alkylimidazolines; resin type emulsifiers such as polyoxyethylene group-containing urethane resins and carboxylate group-containing urethane resins; and cationic emulsifiers such as imidazoline laurate, lauryl trimethyl ammonium chloride, stearylbetaine, distearyldimethylammonium chloride. These emulsifiers may be used singly or two or more species thereof may be used in combination. Among these, nonionic emulsifiers are preferable because they can improve the water resistance of a coating film due to no inclusion of highly hydrophilic, ionic polar groups.

A blending ratio of the neutralizing agent is also set depending on the blending ratios of the acid-modified chlorinated polyolefin-based resin, the emulsifying agent and water, and in particular, the neutralizing agent is blended in consideration of sufficiently neutralizing acidic functional groups (e.g., acid anhydride groups or carboxyl groups) included in the acid-modified chlorinated polyolefin, the emulsifier, etc. For example, the blending ratio is preferably 0.2 to 10 equivalents, and more preferably 0.5 to 4 equivalents per equivalent of acidic functional groups included in the acid-modified chlorinated polyolefin. When the blending ratio is less than 0.2 equivalents, emulsification becomes insufficient, whereas when it exceeds 10 equivalents, the remaining neutralizing agent or the like may deteriorate water resistance and tends to promote dechlorination.

A pH value of the emulsion determined by the blending of the neutralizing agent is preferably 7 to 11, more preferably 7.5 to 10.5, and most preferably 8 to 10. When the pH value of the emulsion is less than 7, the neutralization may be insufficient, and the storage stability of the emulsion tends to deteriorate. On the other hand, when the pH of the emulsion exceeds 11, a free neutralizing agent will be present excessively in the emulsion, so that the emulsion will emit a strong neutralizing agent odor and will be difficult for use.

The neutralizing agent performs an action of adhering to at least one selected from the acid anhydride group and the carboxyl group included in the chlorinated polyolefin resin and neutralizing these groups, thereby enhancing the hydrophilicity of the acid-modified chlorinated polyolefin and improving the storage stability of the emulsion.

As the neutralizing agent, an organic based strong base described below is essential, and this may be comprised in combination with a usual organic based amine or ammonia if necessary.

Examples of the usual organic based amine include monoamines such as trimethylamine, triethylamine, butylamine, dibutylamine, and N-methylmorpholine; polyamines such as ethylenediamine, hexamethylenediamine, piperazine, isophoronediamine, triethylenediamine, and diethylenetriamine; and alkanolamines such as monoethanolamine, diethanolamine, triethanolamine, N-methyldiethanolamine, N,N-dimethylethanolamine, and 2-amino-2-methylpropanol.

A blending ratio of water is preferably 50 to 95% by mass, more preferably 60 to 85% by mass, and most preferably 65 to 80% by mass of the whole emulsion. When the blending ratio of water is less than 50% by mass, the nonvolatile content in the emulsion may become too high, so that agglomeration and the like are liable to occur and the storage stability of the emulsion tends to deteriorate. On the other hand, when the blending ratio of water exceeds 95% by mass, the production efficiency may be lowered in the step of producing an emulsion described below, and when the emulsion is used for a primer coating composition, the nonvolatile content thereof may become low and the application workability may tend to deteriorate. An average particle diameter of polymer particles mainly containing an acid-modified chlorinated polyolefin-based resin in an emulsion is not particularly limited, and is preferably 0.01 to 1 µm, more preferably 0.05 to 0.5 µm, and more preferably 0.1 to 0.5 µm. When the average particle diameter of the polymer particles is less than 0.01 µm, a large amount of emulsifier is required, and the water resistance or weather resistance of the coating film may tend to deteriorate. On the other hand, when the average particle size of the polymer particles exceeds 1 µm, the storage stability of the emulsion may deteriorate and the volume of the polymer particles may be too large, so that a large amount of melting heat and time may be required for forming a coating film. Furthermore, the appearance, water resistance, solvent resistance and the like of a resulting coating film may tend to deteriorate.

The method for emulsifying the acid-modified chlorinated polyolefin-based resin may be a known method. For example, the acid-modified chlorinated polyolefin-based resin is heated or dissolved directly with use of an emulsifier, a neutralizing agent and a solvent if necessary, and then emulsified in water by using a commercially available emulsifying machine, or the acid-modified chlorinated polyolefin-based resin is heated or dissolved directly with use of an emulsifier and a solvent if necessary, and then emulsified in water containing a neutralizing agent by using a commercially available emulsifying machine. Conversely, water is added slowly under agitation to an organic phase prepared by heating or dissolving directly the acid-modified chlorinated polyolefin-based resin with use of an emulsifier, a neutralizing agent and a solvent if necessary, so that phase-inversion emulsification is performed, or water containing a neutralizing agent is added slowly under agitation to an organic phase prepared by heating or dissolving directly the acid-modified chlorinated polyolefin-based resin with use of an emulsifier and a solvent if necessary, so that phase-inversion emulsification is performed.

Examples of the solvent to be used for the above-mentioned emulsification methods include aromatic solvents such as xylene, toluene, and SOLVESSO 100 (produced by Exxon), and ethylene glycol-based and propylene glycol-based solvents such as diethylene glycol monoethyl ether acetate, butyl cellosolve, propylene glycol monomethyl ether, dipropylene glycol monomethyl ether, and propylene glycol-n-propyl ether.

(Aqueous Non-Chlorinated Polyolefin-Based Resin)

The primer coating composition of the present invention may contain an aqueous non-chlorinated polyolefin-based resin. Since both a crystalline portion and an amorphous portion exist moderately in the skeleton of the aqueous non-chlorinated polyolefin-based resin, a melting point can be controlled while preserving crystal sites and the adhesion to a material and the gasohol resistance can be simultaneously achieved at a higher order. The aqueous non-chlorinated polyolefin-based resin is a component to form a matrix of the coating film and can be melted by heat. The aqueous non-chlorinated polyolefin-based resin in the present invention may include an aqueous non-chlorinated polypropylene-based resin. Preferably, the aqueous non-chlorinated polyolefin-based resin is an aqueous non-chlorinated polypropylene-based resin.

The aqueous non-chlorinated polyolefin-based resin has, for example, a crystallinity of 35 to 55%. When the crystallinity is less than 35%, the gasohol resistance and the water resistance may be poor and the adhesion may be insufficient. When the crystallinity exceeds 55%, meltability may be lowered and the adhesion to a material may deteriorate. In the present description, a method for measuring the crystallinity is as follows.

(Crystallinity)

The stereoregularity [mmmm] of an aqueous polypropylene-based resin was measured by 13 C-NMR spectroscopy using an NMR instrument (manufactured by JEOL Ltd., 400 MHz). A sample (350 to 500 mg) was completely dissolved in about 2.2 ml of orthodichlorobenzene in an NMR sample tube of 10 mm in diameter. Subsequently, about 0.2 ml of deuterated benzene was added as a lock solvent and homogenized, and then measurement was performed at 130° C. by a proton complete decoupling method. As for measuring conditions, a flip angle was 90° and a pulse pitch was 5T1 or more (T1 is the longest time of spin-lattice relaxation times of a methyl group). In propylene-based polymers, since spin-lattice relaxation times of a methylene group and a methine group are shorter than that of a methyl group, the recovery of magnetization of all carbons is 99% or more in these measuring conditions. The stereoregularity was measured by integrating spectra for 20 hours or more.

As for chemical shifts, a chemical shift of a peak based on a methyl group which is a third unit in five propylene unit chains having the same absolute configurations of a methyl branch, that is, expressed by mmmm among 10 species of pentads (mmmm, mmmr, rmmr, mmrr, mmrm, rmrr, rmrm, rrrr, rrrm, and mrrm) in a propylene unit chain portion consisting of head to tail bonds is set at 21.8 ppm. In addition, based on this, chemical shifts of other carbon peaks are determined. In accordance with this basis, in the case of five other propylene unit chains, chemical shifts of a peak based on a methyl group which is a third unit are generally as follows. That is, mmmr: 21.5 to 21.7 ppm, rmmr: 21.3 to 21.5 ppm, mmrr: 21.0 to 21.1 ppm, mmrm and rmrr: 20.8 to 21.0 ppm, rmrm: 20.6 to 20.8 ppm, rrrr: 20.3 to 20.5 ppm, rrrm: 20.1 to 20.3 ppm, and mrrm: 19.9 to 20.1 ppm.

With respect to the polypropylene main chain, the ratio (S1/S) of an area S1 of the peak in which 21.8 ppm is a peak top to a total area S of the peaks belonging to the pentads appearing in a range of 19.8 ppm to 22.2 ppm when a chemical shift of a peak top of the peak belonging to the pentad expressed by mmmm is set at 21.8 ppm, that is, all pentads of mmmm, mmmr, rmmr, mmrr, mmrm, rmrr, rmrm, rrrr, rrrm, and mrrm was defined as the crystallinity.

In the present description, since the crystallinity is measured according to the method described above, the crystallinity of a copolymer of propylene and another monomer means the crystallinity of a polypropylene segment in a resin.

A weight-average molecular weight of the aqueous non-chlorinated polyolefin-based resin is 50,000 to 200,000.

When the weight-average molecular weight is less than 50,000, the adhesion of a coating film may deteriorate due to reduction in a cohesive force of a coating film, and the gasohol resistance, the moisture resistance, and the water resistance may deteriorate. When the weight-average molecular weight is more than 200,000, it may become difficult to make a resin aqueous and this will interfere with production of an aqueous resin.

In this description, a method for measuring the weight-average molecular weight is as follows.

(Weight-Average Molecular Weight)

First, 20 mg of a sample was put into a 30 ml-vial bottle, and to this, 20 g of orthodichlorobenzene containing BHT in an amount of 0.04% by mass as a stabilizer was added. The sample was dissolved using an oil bath heated to 135° C., and then thermally filtrated with a PTFE (polytetrafluoroethylene) filter with a bore size of 3 μm to prepare a sample solution having a polymer concentration of 0.1% by mass. Next, the weight-average molecular weight was measured by gel permeation chromatography (GPC) using GPC 150CV manufactured by Waters equipped with TSKgel GM H-HT (30 cm, 4 columns) as a column and an RI detector. As measuring conditions, injection amount of a sample solution: 500 μl, column temperature: 135° C., solvent: orthodichlorobenzene, and an eluent flow rate: 1.0 ml/min were employed.

On the determination of a molecular weight, a commercially available monodispersed polystyrene was used as a standard sample, and the molecular weight was obtained in terms of the polystyrene standard sample.

The above-mentioned aqueous non-chlorinated polyolefin-based resin is an aqueous non-chlorinated polypropylene-based resin, for example. The aqueous non-chlorinated polypropylene-based resin is an aqueous polypropylene-based resin that is not chlorinated. In the present invention, an aqueous non-chlorinated polypropylene-based resin may be used. The aqueous non-chlorinated polypropylene-based resin can exhibit excellent adhesion with a substrate even when forming a coating film by baking and drying at low temperatures. Examples of the aqueous non-chlorinated polypropylene-based resin include a homopolymer of propylene and a copolymer of propylene and a chlorine-free monomer copolymerizable with propylene (ethylene, etc.).

The aqueous non-chlorinated polyolefin-based resin is preferably a polypropylene-based resin in which 90% by mass or more of constituent monomers is propylene. When the ratio of propylene is less than 90% by mass in the polypropylene-based resin, a crystallinity segment of the resin may become small, and the gasohol resistance and the ability of a car's coating film to be washed with a high pressure jet may deteriorate.

In the polypropylene resin, examples of the constituent monomers other than propylene include mono- or diolefins having 2 or 4 to 20 carbon atoms such as butene, pentene, hexene, octene, decene, butadiene, hexadiene, octadiene, cyclobutene, cyclopentene, cyclohexene, norbornene, norbornadiene, styrene, and derivatives thereof. In the present description, the contents of the monomers constituting the resin can be determined from the amounts of monomers used for producing the resin.

The aqueous non-chlorinated polyolefin-based resin is preferably a resin obtained by using a metallocene catalyst. This means that the metallocene catalyst can generally control microtacticity by ligand design, that is, the resulting polypropylene main chain contains an isotactic block having a crystallizable chain length in contrast to atactic polypropylene. The existence of the isotactic block, in other words, means that blocks consisting of sequences having disordered stereospecificity exist simultaneously in the main chain. That is, blocks having crystallinity and amorphous blocks coexist in the polypropylene main chain formed by polymerization using the metallocene catalyst, and the block having crystallinity is composed of an isotactic block having a relatively long mean chain length and has a unique structure that is a highly isotactic structure. By such a characteristic, in the coating composition including the polyolefin formed by polymerization using the metallocene catalyst, it is possible to achieve the effect of the present invention well even in a coating film to be obtained by drying at a temperature of 120° C. or lower. As the metallocene catalyst, a publicly known metallocene catalyst can be used, and an example thereof includes a catalyst described in JP-A-2004-115712 (paragraphs [0021] to [0052]).

The aqueous non-chlorinated polyolefin-based resin is preferably a resin modified with an unsaturated organic acid or anhydride thereof (hereinafter, may be referred to as a modified polypropylene-based resin). Examples of the resin modified with an unsaturated organic acid or anhydride thereof include resin modified by grafting an unsaturated carboxylic acid having 3 to 25 carbon atoms or an anhydride thereof onto the main chain of the above polypropylene-based resin. This graft reaction can be performed by a normal method using a radical generator.

Examples of the unsaturated carboxylic acid or anhydride thereof to be grafted include maleic acid, fumaric acid, itaconic acid, tetrahydrophthalic acid, citraconic acid, crotonic acid, allylsuccinic acid, mesaconic acid, aconitic acid, and anhydrides thereof, and among these, maleic acid and maleic anhydride are preferred.

A ratio of addition of the unsaturated carboxylic acid or anhydride thereof to the modified polypropylene-based resin (the content of the unsaturated carboxylic acid or anhydride thereof in the modified polypropylene-based resin), which can be used for the present invention, is 1 to 10% by mass, and preferably 1.5 to 5% by mass based on the total amount of the aqueous non-chlorinated polyolefin-based resin. When the ratio of addition is less than 1% by mass, dispersed particles of a primer coating composition to be obtained may have a large particle diameter and the dispersion stability of the particles may tend to be defective. On the other hand, when the ratio of addition is more than 10% by mass, the water resistance of a coating film may tend to deteriorate. The ratio of addition can be measured by comparing the absorption intensity of a carbonyl group with an absorption intensity calibration curve of a carbonyl group which has been prepared based on samples having known ratios of addition (contents) by infrared spectroscopic analysis.

The method of adding the unsaturated carboxylic acid or anhydride thereof is generally a method of performing graft reaction by subjecting a resin to decomposition conditions of a radical generator in the presence of the radical generator. One example of this method include a method in which a polypropylene main chain is dissolved in an organic solvent, and to this, the unsaturated carboxylic acid or anhydride thereof and the radical generator are added, and the resulting mixture is heated under stirring to perform addition. Another example include a method of supplying components to an extruder and performing addition while heating and kneading the components.

A molar ratio of the radical generator to the unsaturated carboxylic acid or anhydride thereof to be used (ratio of the radical generator to the unsaturated carboxylic acid or anhydride thereof) is usually 1/100 to 3/5, preferably 1/20 to 1/2, and the reaction temperature is not particularly limited, but it is usually 50° C. or higher, preferably 80 to 200° C. The reaction time is usually 2 to 10 hours.

The radical generator used for the graft reaction can be appropriately selected from common radical generators to be used, and examples thereof include organic peroxides. Examples of the organic peroxides include diisopropyl peroxide, di(t-butyl)peroxide, t-butyl hydroperoxide, benzoyl peroxide, dicumyl peroxide, cumyl hydroperoxide, dilauroyl peroxide, dibenzoyl peroxide, methyl ethyl ketone peroxide, cyclohexanone peroxide, cumene hydroperoxide, diisopropyl peroxycarbonate, dicyclohexyl peroxycarbonate, and t-butyl peroxyisopropylmonocarbonate. Among these peroxides, di(t-butyl)peroxide, dicumyl peroxide, and t-butyl peroxyisopropylmonocarbonate are preferred.

Examples of the organic solvent used in performing the graft reaction in a state of dissolution or impregnation include aromatic hydrocarbons such as benzene, toluene, and xylene, aliphatic hydrocarbons such as hexane, heptane, octane, and decane, and halogenated hydrocarbons such as trichloroethylene, perchloroethylene, chlorobenzene, and o-dichlorobenzene, and among these solvents, aromatic hydrocarbons and halogenated hydrocarbons are preferred, and particularly toluene, xylene, and chlorobenzene are preferred.

When a modified polypropylene-based resin having an unsaturated dicarboxylic monoester as a modifying component is produced, it can be produced by, in addition to the method of grafting unsaturated dicarboxylic monoester onto a polypropylene main chain as described above, a method of grafting an unsaturated dicarboxylic acid or anhydride thereof onto a polypropylene main chain and then esterifying one of carboxyl groups with an aliphatic alcohol or monoesterifying an acid anhydride group.

Preferably, the aqueous non-chlorinated polyolefin-based resin has a melting point of 50 to 100° C. When the melting point is less than 50° C., an amorphous component may increase, the gasohol resistance, the moisture resistance, and the ability of a car's coating film to be washed with a high pressure jet may deteriorate. When the melting point is more than 100° C., the melting property may be lowered and the adhesion to a material may be poor. In the present description, a method for measuring the melting point (° C.) of the aqueous polyolefin-based resin (A) is as follows.

(Method for Measuring Melting Point)

Values measured according to the following steps using a differential scanning calorimeter (DSC) (thermal analyzer SSC 5200 manufactured by Seiko Instruments Inc.) were used. That is, in the step of raising a temperature from 20° C. to 150° C. at a temperature raising rate of 10° C./min (step 1), the step of lowering the temperature from 150° C. to −50° C. at a temperature lowering rate of 10° C./min (step 2), and the step of raising the temperature from −50° C. to 150° C. at a temperature raising rate of 10° C./min (step 3), the temperature indicated by an arrow in FIG. 1 illustrating a chart during temperature raising in the step 3 was set as a melting point (Tm).

A method of making the aqueous non-chlorinated polyolefin-based resin aqueous is not particularly limited and publicly known methods can be employed. An example of the methods includes a method in which toluene is added to the acid anhydride modified polypropylene produced as described above to dissolve the polypropylene at about 100° C., to form a resin solution, and then a surfactant is added to this resin solution, and deionized water in about 50° C. is added dropwise to the resulting mixture while the resulting mixture is forcibly stirred in a state in about 50 to 60° C. to emulsify the mixture through phase inversion, and then toluene is removed under reduced pressure. Another example of the methods includes a method in which the acid anhydride modified polypropylene resin is dissolved under heat with a solvent such as tetrahydrofuran at about 60° C., and after the carboxyl group of the resin is neutralized with excessive amine, deionized water in about 60° C. is added dropwise to this resin solution while the resin solution is forcibly stirred to emulsify the mixture through phase inversion, and then the solvent is removed under reduced pressure. Further, there is also a method in which an emulsifier and amine are mixed together into the dissolved solution, and deionized water in about 60° C. is added dropwise to the resulting mixture while the resulting mixture is forcibly stirred to emulsify the mixture, and then the solvent is removed under reduced pressure. There is also a method in which in contradiction to the above-mentioned procedure, an acid anhydride modified polyolefin solution dissolved with the above heated solvent is added dropwise to hot water in which a neutralizing agent such as amine and/or a surfactant, etc. is dissolved, while the hot water is forcibly stirred, to emulsify the resulting mixture, and then the solvent is removed under reduced pressure.

The aqueous non-chlorinated polyolefin-based resin is preferably an aqueous polypropylene-based resin that has been made aqueous without using an emulsifier. By using no emulsifier, the moisture resistance of a multilayer coating film to be obtained can be further improved.

An average particle diameter of polymer particles mainly containing an aqueous non-chlorinated polyolefin-based resin in an emulsion is not particularly limited, and is preferably 0.01 to 1 μm, more preferably 0.05 to 0.5 μm, and most preferably 0.1 to 0.5 μm. When the average particle diameter of the polymer particles is less than 0.01 μm, a large amount of emulsifier is required, and the water resistance or weather resistance of the coating film may tend to deteriorate. On the other hand, when the average particle size of the polymer particles exceeds 1 μm, the storage stability of the emulsion may deteriorate and the volume of the polymer particles may be too large, so that a large amount of melting heat and time are required for forming a coating film. Furthermore, the appearance, water resistance, solvent resistance and the like of a resulting coating film may tend to deteriorate.

<Aqueous Epoxy Resin (B)>

The primer coating composition of the present invention contains an aqueous epoxy resin (B). By containing of the aqueous epoxy resin (B), the water resistance and moisture resistance of a coating film can be improved. A content of the aqueous epoxy resin (B) is preferably 20 to 50 parts by mass based on 100 parts by mass of the resin solid content of the primer coating composition in terms of solid content. When the content is less than 20 parts by mass, defective water resistance and defective moisture resistance due to the reduction of gel fraction may occur. When the content is more than 50 parts by mass, defective water resistance and defective moisture resistance due to defective film formation may occur.

The aqueous epoxy resin (B) is an aqueous resin having one or more epoxy groups in its molecule, and those known in the art can be used. Examples of the aqueous epoxy resin (B) include Denacol EM150 produced by Nagase ChemteX Corporation, EPIREZ 6006W70 and 5003W55 produced by JAPAN CHEMTECH LTD., and WEX-5100 produced by Tohto Kasei Co., Ltd, which are prepared by forcibly emulsifying a novolac epoxy resin obtained by adding epichlorohydrin to a phenol novolac resin with an emulsifier. Examples of the aqueous epoxy resin (B) further include Denacol EM101, EM103 produced by Nagase ChemteX Corporation, and EPIREZ 3510W60, 3515W6, 3522W60, 3540WY55 produced by JAPAN CHEMTECH LTD., which are prepared by forcibly emulsifying a bisphenol epoxy resin obtained by adding epichlorohydrin to bisphenol with an emulsifier. Further, examples of alkyl type epoxy resins formed by adding epichlorohydrin to polyols such as sorbitol, pentaerythritol and glycerol include Denacol EX-611, EX-614, EX-411, EX-313 produced by Nagase ChemteX Corporation.

<Hydrophilicized-Modified Carbodiimide Compound (C)>

A content of the hydrophilicized-modified carbodiimide compound (C) contained in the primer coating composition of the present invention is preferably 3 to 10 parts by mass, more preferably 3 to 9 parts by mass, and even more preferably 3 to 7 parts by mass based on 100 parts by mass of the resin solid content of the primer coating composition. When the content of the hydrophilicized-modified carbodiimide compound (C) is less than 3 parts by mass, a water resistance improvement effect may not be obtained. When the content of the hydrophilicized-modified carbodiimide compound (C) exceeds 10 parts by mass, water-shrinkage resistance may be poor.

The hydrophilicized-modified carbodiimide compound (C) contained in the primer coating composition of the present invention has, in its molecule, one or a plurality of structural units represented by

—OCONH—X—NHCOOY wherein X is a bifunctional organic group having at least one carbodiimide group, and Y is a structure resulting from elimination of a hydroxyl group from a polyalkylene glycol monoalkyl ether. It is considered that the inclusion of the structural unit offers both excellent dispersibility in water and excellent curability.

The hydrophilicized-modified carbodiimide compound (C) has three types, namely, a compound having one unit of the structural unit shown above, a compound having two units of the structural unit shown above, and a compound having three units of the structural unit shown above.

One example of the compound having two units of the structural unit shown above is a compound represented by the following formula (I).

[Chemical Formula 5]

YOCONH—X—NHCOO—Z—OCONH—X—NHCOOY (I)

In the above formula (I), Xs are each a bifunctional organic group having at least one carbodiimide group, Ys are identical or different structures each resulting from elimination of a hydroxyl group from a polyalkylene glycol monoalkyl ether, and Z is a structure resulting from elimination of a hydroxyl group from a bifunctional polyol having a number-average molecular weight of 200 to 5,000.

Here, X can be represented by the following formula (a).

[Chemical Formula 6]

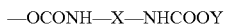

(a)

In the above formula (a), each $R^2$ is preferably a hydrocarbon group having 6 to 15 carbon atoms. Specific examples of the hydrocarbon group may include a phenylene group, a diphenylenemethyl group, a diphenylene (dimethyl)methyl group, a methylphenylene group, a dimethylphenylene group, a tetramethylxylylene group, a hexylene group, a cyclohexylene group, and a dicyclohexylenemethyl group. Preferred is a dicyclohexylenemethyl group. In the above formula, p is 1 to 10. p is the number of the carbodiimide groups existing in the above structural unit, and p is preferably 2 or more in terms of curability, and the upper limit is preferably 8 or less.

In the present description, repeat numbers, including the above p, are represented as average values.

The above Y can be represented by the following formula (b) or (c).

[Chemical Formula 7]

(b)

(c)

In the above formulas (b) and (c), $R^3$ is preferably an alkyl group having 1 to 20 carbon atoms. Specific examples thereof include a methyl group, an ethyl group, a butyl group, a hexyl group, an octyl group, a decyl group, a dodecyl group, and a stearyl group. $R^4$ is a hydrogen atom or a methyl group, and is preferably a hydrogen atom. q is 4 to 40. In the above formulas (b) and (c), when $R^4$ is hydrogen, the formulas (b) and (c) represent the same structure.

The above Z is polymeric structure composed of an ether linkage, an ester linkage, or a carbonate linkage, and it is difficult to express Z by a general formula. In this regard, see the explanation for a bifunctional polyol having 200 to 5,000 that is described below.

A hydrophilicized-modified carbodiimide compound (C) having two units of the above structural unit can be obtained by reacting a raw material carbodiimide compound having at least two isocyanate groups in its molecule with a bifunctional polyol having hydroxyl groups at its molecular ends and having a number-average molecular weight of 200 to 5,000 in such a ratio that the molar amount of the isocyanate groups of the raw material carbodiimide compound is larger than the molar amount of the hydroxyl groups of the polyol, and then further reacting the thus-obtained reaction product with a polyalkylene glycol monoalkyl ether.

From the viewpoint of reactivity, the raw material carbodiimide compound having at least two isocyanate groups in its molecule preferably has isocyanate groups at its both ends. A method for producing the raw material carbodiimide compound having isocyanate groups at its both ends is well known to those skilled in the art and, for example, a condensation reaction accompanied by a decarboxylation of an organic diisocyanate can be utilized.

As to the organic diisocyanate, specifically, aromatic diisocyanates, aliphatic diisocyanates, alicyclic diisocyanates, and mixtures thereof can be used. Specific examples thereof include 1,5-naphthylene diisocyanate, 4,4-diphenylmethane diisocyanate, 4,4-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, and tetramethylxylylene diisocyanate. From the viewpoint of reactivity, dicyclohexylmethane-4,4-diisocyanate is preferred.

For the condensation reaction, a carbodiimidization catalyst is usually used. Specific examples of the carbodiimidization catalyst include phospholene oxides such as 1-phenyl-2-phospholene-1-oxide, 3-methyl-2-phospholene-1-oxide, 1-ethyl-2-phospholene-1-oxide, 3-methyl-1-phenyl-2-phospholene-1-oxide, and 3-phospholene isomers thereof. From the viewpoint of reactivity, 3-methyl-1-phenyl-2-phospholene-1-oxide is preferred.

While the bifunctional polyol having hydroxyl groups at its both molecule ends is not particularly limited, it is preferably the bifunctional polyol having hydroxyl groups at its both molecule ends and the number-average molecular weight of 200 to 5,000 from the viewpoint of reaction efficiency. Specific examples of the bifunctional polyol having hydroxyl groups at its both molecule ends may include polyether diols, polyester diols, and polycarbonate diols. For example, polyalkylene glycols such as polyethylene glycol, polypropylene glycol, polyethylene propylene glycol, polytetramethylene ether glycol, polyhexamethylene ether glycol, and polyoctamethylene ether glycol, polyester diols such as polyethylene adipate, polybutylene adipate, polyhexamethylene adipate, polyneopentyl adipate, poly-3-methylpentyl adipate, polyethylene/butylene adipate, and polyneopentyl/hexyl adipate, polylactone diols such as polycaprolactone diol and poly-3-methylvalerolactone diol, polycarbonate diols such as polyhexamethylenecarbonate diol, and mixtures thereof can be mentioned.

The reaction of the raw material carbodiimide compound having at least two isocyanate groups in its molecule with the bifunctional polyol having hydroxyl groups at its molecular ends and having a number-average molecular weight of 200 to 5,000 is performed by reacting them in such a ratio that the molar amount of the isocyanate groups of the raw material carbodiimide compound is larger than the molar amount of the hydroxyl groups of the polyol. When the molar amount of the isocyanate groups is smaller than or equal to the molar amount of the hydroxyl groups, a reaction together with a polyalkylene glycol monoalkyl ether described below cannot be performed sufficiently.

The ratio between the molar amount of the isocyanate groups of the raw material carbodiimide compound and the molar amount of the hydroxyl groups of the polyol having hydroxyl groups at its molecular ends is preferably 1.1:1.0 to 2.0:1.0 from the viewpoint of reaction efficiency and economical efficiency. A degree of polymerization of the raw material carbodiimide compound and the bifunctional polyol having hydroxyl groups at its both molecular ends in a reaction product obtained via this step is preferably 1 to 10 from the viewpoint of reaction efficiency.

By further reacting the thus-obtained reaction product with a polyalkylene glycol monoalkyl ether, a hydrophilicized-modified carbodiimide compound (C) having two units of the above structural unit can be obtained. As the polyalkylene glycol monoalkyl ether, a polyalkylene glycol monoalkyl ether represented by the following formula (b') or (c') is used.

[Chemical Formula 8]

(b')

(c')

In the above formulas (b') and (c'), the contents described for $R^3$, $R^4$, and q in the preceding formulas (b) and (c) apply as they are. The type of $R^4$ and q in the above unit are set appropriately within the above ranges, respectively, in consideration of storage stability, dispersibility in water, and reactivity after volatilization of water. It is preferable from the viewpoint of dispersibility in water that $R^3$ in the monoalkoxypolyalkylene glycol be a methyl group and $R^4$ be a hydrogen atom. Moreover, from the viewpoint of dispersibility in water and reactivity after volatilization of water, the q is preferably 4 to 20, and more preferably 6 to 12.

As the polyalkylene glycol monoalkyl ether, a polyalkylene glycol monoalkyl ether having a number-average molecular weight of 200 to 5,000 is preferably used. The alkyl group of the polyalkylene glycol monoalkyl ether is preferably an alkyl group having 1 to 20 carbon atoms. Specific examples of the polyalkylene glycol monoalkyl ether include those composed of polyethylene glycol, polypropylene glycol, or mixtures thereof each of which is capped at one end with an alkyl group having 1 to 20 carbon atoms. More detailed specific examples of such a polyalkylene glycol monoalkyl ether include polyethylene glycol monomethyl ether, polyethylene glycol mono-2-ethylhexyl ether, polyethylene glycol monolauryl ether, polypropylene glycol monomethyl ether, polypropylene glycol mono-2-ethylhexyl ether, and polypropylene glycol monolauryl ether, each having a number-average molecular weight of 200 to 5,000.

The reaction product and the polyalkylene glycol monoalkyl ether are reacted in such a ratio that the molar amount of the isocyanate groups of the reaction product is equal to or larger than the molar amount of the hydroxyl groups of the polyalkylene glycol monoalkyl ether. When the molar amount of the isocyanate groups is smaller than the molar amount of the hydroxyl groups, the reaction of the polyalkylene glycol monoalkyl ether with the reaction product cannot be carried out sufficiently. The molar amount of the isocyanate groups of the reaction product can be measured directly, and a value calculated from the charging formulation may be adopted.

In the reaction of the raw material carbodiimide compound with the bifunctional polyol having hydroxyl groups at its molecular ends and the reaction of the reaction product with the polyalkylene glycol monoalkyl ether, a catalyst may be used. The temperature during the reactions is not particularly limited, and from the viewpoint of control of the reaction system or reaction efficiency, the temperature is preferably 60 to 120° C. In addition, an organic solvent free from active hydrogen is preferably used in the reactions.

Such a two-step reaction can provide a hydrophilicized-modified carbodiimide compound (C) having two units of the above structural unit. The thus-produced hydrophilicized-modified carbodiimide compound (C) does not have only the structure of the formula (I) provided above, but is a mixture containing other various reaction products derived from the raw materials used. Generally, however, it may be considered to have the structure of the above formula (I).

One example of the hydrophilicized-modified carbodiimide compound (C) having three units of the above structural unit is a compound represented by the following formula (II).

[Chemical Formula 9]

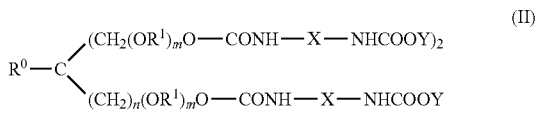

(II)

In the above formula (II), for X and Y, the description for X and Y made for the preceding one having two units of the above structural unit can apply as it is. $R^0$ is hydrogen, a methyl group, or an ethyl group. $R^1$s are each an alkylene group having 4 or less carbon atoms, and may be either identical or different. Specific alkylene groups include a methylene group, an ethylene group, a propylene group, and a butylene group. n is 0 or 1, and m is 0 to 60.

$R^0$, $R^1$, n and m are determined depending on a trifunctional polyol to be used for the production of the hydrophilicized-modified carbodiimide compound (C).

When m is 11 or more, the ratio of a hydrophilic section to a hydrophobic section is preferably 2.0 to 6.3. The ratio of the hydrophilic section to the hydrophobic section can be determined by dividing the molecular weight of the moiety of an oxymethylene group or an oxyethylene group existing in the carbodiimide compound by the molecular weight of the carbodiimide compound.

The hydrophilicized-modified carbodiimide compound (C) having three units of the above structural unit can be obtained by reacting a raw material carbodiimide compound having at least two isocyanate group in one molecule with a polyalkylene glycol monoalkyl ether in such a ratio that the equivalent of the isocyanate groups of the raw material carbodiimide compound is larger than the equivalent of the hydroxyl groups of the polyalkylene glycol monoalkyl ether, and further reacting the resulting reaction product with a trifunctional polyol.

For the raw material carbodiimide compound having at least two isocyanate group in one molecule, the description made for the raw material carbodiimide compound of the hydrophilicized-modified carbodiimide compound (C) having two units of the above structural unit applies as it is.

The reaction of the raw material carbodiimide compound with the polyalkylene glycol monoalkyl ether is required to make isocyanate groups remain in order to further react with a trifunctional polyol after the reaction. For this reason, it is necessary in the above reaction that the equivalent of the isocyanate groups is larger than the equivalent of the hydroxyl groups, and it is preferred that the equivalent ratio of the isocyanate groups to the hydroxyl groups be 2/1. The reaction can usually be carried out under conditions well-known to those skilled in the art, and a tin-based catalyst may be used, if necessary.

For the polyalkylene glycol monoalkyl ether, the description made for the polyalkylene glycol monoalkyl ether of the hydrophilicized-modified carbodiimide compound (C) having two units of the above structural unit applies as it is.

Next, the thus-obtained reaction product is reacted with a trifunctional polyol. The amount of the trifunctional polyol to be used for the reaction is preferably such an amount that the hydroxyl group equivalent is equal to or larger than the isocyanate equivalent in the reaction product, and more preferably, the isocyanate equivalent is equal to the hydroxyl group equivalent. The isocyanate equivalent in the reaction product not only can be measured directly but also can be determined by calculation from the blending ratio of the diisocyanate compound and the polyalkylene glycol monoalkyl ether in the preceding step. The reaction can be carried out in the same manner as the reaction of the raw material carbodiimide compound with the polyalkylene glycol monoalkyl ether described previously.

The trifunctional polyol is preferably trimethylolpropane, glycerol, or an alkylene oxide adduct of these because of its easy availability. Examples of the alkylene oxide include ethylene oxide and propylene oxide. An alkylene oxide adduct of glycerol is commercially available from Sanyo Chemical Industries, Ltd. as GP Series. In consideration of the curing reactivity of a three-chain type hydrophilic carbodiimide compound to be obtained, one is particularly preferred in which alkylene oxide has been added to every hydroxyl group. Of the aforementioned GP Series, GP-250 and GP-3000 are mentioned as those having such a structure.

Such a two-step reaction can provide a hydrophilicized-modified carbodiimide compound (C) having three units of the above structural unit. The thus-produced hydrophilicized-modified carbodiimide compound (C) does not have only the structure of the formula (II) described above, but it may be considered to have the structure of the above formula (II).

One example of the hydrophilicized-modified carbodiimide compound (C) having one unit of the above structural unit is a compound represented by the following formula (III),

[Chemical Formula 10]

YOCONH—X—NHCOOY   (III)

wherein X is a bifunctional organic group having at least one carbodiimide group, and Ys are identical or different structures each resulting from elimination of a hydroxyl group from a polyalkylene glycol monoalkyl ether.

X in the formula (III) is a group that can be represented by the formula (a) in the above formula (I).

Ys in the formula (III) are structures resulting from elimination of hydroxyl groups from identical or different polyalkylene glycol monoalkyl ethers. The Ys can represent the same structures of the Ys in the above-described formula (I). Use of the hydrophilicized-modified carbodiimide compound (C) represented by the formula (III) offers an advantage that crosslinking can be held at a higher level. Conceivable reasons for this are that in the formulas (I) and (II) in which there are a plurality of carbodiimide units, the efficiency of the reaction with an acid may be low under a low acid value of an aqueous resin. Furthermore, the crosslinking of the hydroxyl groups of the aqueous resin and the isocyanate may be not disturbed because the formula (III) does not have a bulky structure unlike the formulas (I) and (II). Accordingly, it is considered that the crosslinking of the hydrophilicized-modified carbodiimide compound (C) represented by the formula (III) becomes high for these reasons.

The Ys in the formula (III) are preferably identical or different structures selected from the following (i) or (ii):
(i) a structure resulting from elimination of a hydroxyl group from a polyethylene glycol monoalkyl ether in which an alkyl group having 1 to 3 carbon atoms is ether-linked to an end of a polyethylene oxide unit having a repeat number of 6 to 20,
(ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60.

More preferably, the repeat number of the polypropylene oxide units of the above (ii) is 15 to 60.

Use of the hydrophilicized-modified carbodiimide compound (C) represented by the formula (III) and having the above (i) and (ii) offers an advantage that excellent dispersibility in water is attained and stability is improved and crosslinking is held at a higher level.

The hydrophilicized-modified carbodiimide compound (C) represented by the formula (III) can be prepared by reacting identical or different polyalkylene glycol monoalkyl ethers with the raw material carbodiimide compound obtained through the above-described condensation reaction accompanied by decarbonization of an organic diisocyanate.

The polyalkylene glycol monoalkyl ether is more preferably a polyethylene glycol monoalkyl ether in which an alkyl group having 1 to 3 carbon atoms is ether-linked to an end of a polyethylene oxide unit having a repeat number of 6 to 20, or a polypropylene glycol monoalkyl ether in which an alkyl group having 1 to 8 carbon atoms is ether-linked to an end of a polypropylene oxide unit having a repeat number of 4 to 60. In the preparation of the hydrophilicized-modified carbodiimide compound (C) represented by the formula (III), such a polyethylene glycol monoalkyl ether and such a polypropylene glycol monoalkyl ether may be used either singly or in combination.

Specific examples of the polyethylene glycol monoalkyl ether include polyethylene glycol monomethyl ether, polyethylene glycol monoethyl ether, and polyethylene glycol monopropyl ether, and especially, polyethylene glycol monomethyl ether is suitable.

Specific examples of the polypropylene glycol monoalkyl ether include polypropylene glycol monomethyl ether, polypropylene glycol monoethyl ether, polypropylene glycol monobutyl ether, and polypropylene glycol 2-ethylhexyl ether, and especially, polypropylene glycol monobutyl ether is suitable.

In the hydrophilicized-modified carbodiimide compound (C) represented by the above formula (III), it is preferable that one Y is (i) and the other Y is (ii), and the ratio of the structure resulting from elimination of (i) a hydroxyl group from a polyethylene glycol monoalkyl ether in which an alkyl group having 1 to 3 carbon atoms is ether-linked to an end of a polyethylene oxide unit having a repeat number of 6 to 20 and (ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60 is within a range of (i):(ii)=1:0.7 to 1:8.

In the hydrophilicized-modified carbodiimide compound (C) represented by the formula (III), it is preferable that the surrounding of the carbodiimide group is hydrophobic to a certain degree in order to enhance water resistance when a coating film is formed. Moreover, in order to suppress the deactivation of carbodiimide by water and to keep stability, it is preferable that the surrounding of the carbodiimide group is hydrophobic to a certain degree and the contact with water molecules is kept low. On the other hand, in the hydrophilicized-modified carbodiimide compound (C) represented by the formula (III), the compound is required to have a polyethylene glycol structure in a certain amount in order to maintain hydrophilicity. When the above structures (i) and (ii) are present in a ratio within the range of (i):(ii)=1:0.7 to 1:8, the hydrophobicity can be kept at a certain degree at the surrounding of the carbodiimide group, while the hydrophilicity of the carbodiimide compound is secured. This offers an advantage that a primer coating composition superior in low-temperature curability and also superior in coating material stability can be obtained. The ratio (i):(ii) is more preferably within the range of (i):(ii)=1:0.7 to 1:1.5.

<Aqueous Polyurethane Resin (D)>

The primer coating composition of the present invention contains an aqueous polyurethane resin (D). By using the aqueous polyurethane resin (D), a resulting coating film can have excellent solvent resistance, excellent gasohol resistance and excellent fusibility.

A content of the aqueous polyurethane resin (D) is 15 parts by mass or more, preferably 25 parts by mass or more and 45 parts by mass or less based on 100 parts by mass of the resin solid content of the primer coating composition.

When the content of the aqueous polyurethane resin (D) is less than 15 parts by mass, excellent fusibility may not be obtained and a water resistance improvement effect may not be obtained. When the content of the aqueous polyurethane resin (D) exceeds 45 parts by mass, an effect commensurate with the addition amount may not be obtained and it is uneconomical.

Preferably, the aqueous polyurethane resin (D) has a glass transition point (Tg) of −50° C. or less and a cured film of the aqueous polyurethane resin (D) has an elongation at break of 400% or more at −20° C.

When the glass transition point (Tg) of the aqueous polyurethane resin (D) exceeds −50° C., a coating film to be obtained will be poor in chipping resistance and water resistance. The glass transition point (Tg) is more preferably −55° C. or less, and even more preferably −58° C. or less. The glass transition point (Tg) of the aqueous polyurethane resin (D) can be measured using a differential scanning calorimeter.

When the cured film of the aqueous polyurethane resin (D) has an elongation at break of less than 400% at −20° C., a coating film to be obtained will be poor in chipping resistance and water resistance. The elongation at break is more preferably 500% or more.

The elongation at break in the cured film of the aqueous polyurethane resin (D) can be determined in accordance with JIS K7127. Specifically, 95 parts by mass (in resin solid content amount) of the aqueous polyurethane resin (D) and 5 parts by mass (in resin solid content amount) of the hydrophilicized-modified carbodiimide compound (C) are mixed. The resulting mixture is applied uniformly with a doctor blade such that the dry film thickness is 20 μm. After leaving at rest at 20° C. for 10 minutes, the resulting mixture is preheated at 80° C. for 3 minutes, thereby volatilizing water. Then, the resulting mixture is baked at 120° C. for 30 minutes, and thus a cured film is prepared. The resulting cured film is subjected to a tensile performance test at a testing temperature of −20° C. in accordance with JIS K7127 and an elongation ratio at the time of breaking is measured. The obtained elongation ratio is taken as an elongation at break.

The aqueous polyurethane resin (D) is a polymer obtained by using a polyol compound (D-1), a compound having an active hydrogen group and a hydrophilic group in the molecule (D-2), an organic polyisocyanate (D-3), and, if necessary, a chain extender and a polymerization terminator, and can be prepared by dissolving or dispersing a resulting polymer in water.

The polyol compound (D-1) is not particularly limited as long as it is a polyol compound having two or more hydroxyl groups. Examples of the polyol compound (D-1) include polyhydric alcohols such as ethylene glycol, propylene glycol, 1,4-butanediol, 1,6-hexanediol, trimethylolpropane, and glycerol; polyether polyols such as polyethylene glycol, polypropylene glycol, and polytetramethylene ether glycol; polyester polyols obtained from a reactuin product of dicarboxylic acid such as adipic acid, sebacic acid, itaconic acid, maleic anhydride, phthalic acid, and isophthalic acid, with a glycol such as ethylene glycol, triethylene glycol, propylene glycol, butylene glycol, tripropylene glycol, and neopentyl glycol; polycaprolactone polyol; polybutadiene polyol; polycarbonate polyol; and polythioether polyol. The polyol compound (D-1) may be used singly, or two or more species thereof may be used in combination. The polyol compound (D-1) preferably has a number-average molecular weight of 500 to 5,000.

Examples of the compound having an active hydrogen group and a hydrophilic group in the molecule (D-2) include compounds known as compounds containing active hydrogen and an anionic group {an anionic group or an anion-forming group (a group that reacts with a base to form an anionic group and, in this case, that is converted into an anionic group by neutralizing with a base before, during or after a urethanization reaction)} (those disclosed in JP-B-42-24192 and JP-B-55-41607; specific examples include dimethylolalkanoic acids such as α,α-dimethylolpropionic acid, α,α-dimethylolbutyric acid, and dimethylolacetic acid), compounds known as compounds having active hydrogen and a cationic group in the molecule (e.g., those disclosed in JP-B-43-9076), and compounds known as compounds having active hydrogen and a nonionic group (e.g., those disclosed in JP-B-48-41718; specifically, polyethylene glycol and alkylalcohol alkylene oxide adducts, etc.). It is preferred to use a dimethylolalkanoic acid as the compound having an active hydrogen group and a hydrophilic group in the molecule (D-2).

The organic polyisocyanate (D-3) is not particularly limited as long as it has two or more isocyanate groups in the molecule. Specific examples of the organic polyisocyanate (D-3) include:
aliphatic diisocyanates having 2 to 12 carbon atoms such as hexamethylene diisocyanate, 2,2,4-trimethylhexane diisocyanate, and lysine diisocyanate;
alicyclic diisocyanates having 4 to 18 carbon atoms such as 1,4-cyclohexane diisocyanate, isophorone diisocyanate, 4,4'-dicyclohexylmethane diisocyanate, methylcyclohexylene diisocyanate, and isopropylidenecyclohexyl-4,4'-diisocyanate;
aromatic diisocyanates such as 2,4-toluylene diisocyanate, 2,6-toluylene diisocyanate, diphenylmethane-4,4'-diisocyanate, 1,5'-naphthene diisocyanate, tolidine diisocyanate, diphenylmethylmethane diisocyanate, tetraalkyldiphenylmethane diisocyanate, xylylene diisocyanate, tetramethylxylylene diisocyanate, 4,4'-dibenzyl diisocyanate, and 1,3-phenylene diisocyanate; and triisocyanates such as lysine ester triisocyanate, triphenylmethane triisocyanate, 1,6,11-undecane triisocyanate, 1,8-diisocyanate-4,4-isocyanatemethyloctane, 1,3,6-hexamethylene triisocyanate, and bicycloheptane triisocyanate.

These polyisocyanates may be used in the form of dimer or trimer thereof (isocyanurate linkage), and may be reacted with an amine and used as a biuret. Moreover, it is also possible to use polyisocyanates having a urethane linkage resulting from reacting such polyisocyanate compounds with polyols.

It is more preferred to use an aliphatic diisocyanate as the organic polyisocyanate (D-3). Preparation of the aqueous polyurethane resin (D) using an aliphatic diisocyanate offers an advantage that the water permeability of a coating film to be obtained can be adjusted to a proper range and good low-temperature initial water resistance can be obtained.

The chain extender that can be used if necessary in the preparation of the aqueous polyurethane resin (D) is not particularly limited as long as it has two or more active hydrogen groups, and examples thereof include low molecular weight polyols (number-average molecular weight of less than 500) and polyamines. Examples of the low molecular weight polyols include ethylene glycol, propylene glycol, 1,4-butanediol, 3-methylpentanediol, 2-ethyl-1,3-hexanediol, and trimethylolpropane. Examples of the polyamines include ethylenediamine, hexamethylenediamine, diethylenetriamine, hydrazine, xylylenediamine, and isophoronediamine.

Examples of the polymerization terminator include a compound having one active hydrogen in its molecule, and a monoisocyanate compound.

Examples of the compound having one active hydrogen in its molecule include monoalcohols (e.g., alkyl alcohols such as methanol, butanol and octanol, alkyl alcohol alkylene oxide adducts), and monoamines (e.g., alkylamines such as butylamine and dibutylamine).

Examples of the monoisocyanate compound include methylisocyanate, ethylisocyanate, propylisocyanate, butylisocyanate, laurylisocyanate, cyclohexylisocyanate, phenylisocyanate, and tolyleneisocyanate.

A reaction method in producing the aqueous polyurethane resin (D) may be any method of a one-shot method in which the respective components are reacted at once and a multistage method in which the respective components are reacted in steps {a method of producing the resin by reacting part of an active hydrogen-containing compound (e.g., macromolecular polyol) with a polyisocyanate, thereby forming an NCO terminated prepolymer, and then reacting the remainder of the active hydrogen-containing compound}. The reaction of synthesizing the aqueous polyurethane resin (D) is performed usually at 40 to 140° C., and preferably 60 to 120° C. In order to accelerate the reaction, there may be used a catalyst that is usually used for a urethanization reaction, such as a tin-based catalyst including dibutyltin laurate and tin octylate or an amine-based catalyst including triethylenediamine. In addition, the above reaction may be carried out in an organic solvent that is inert to isocyanate (e.g., acetone, toluene, dimethylformamide, etc.), and the solvent may be added either during the reaction or after the reaction.

The aqueous polyurethane resin (D) in the present invention can be prepared by treating a resulting polymer with a known method (a method of forming an anionic group by neutralization with a base in the case of an anion-forming group, a method of forming a cationic group with a quaternarizing agent or a method of forming a cationic group by neutralization with an acid in the case of a cation-forming group) and then dispersing the polymer in water.

The step of dissolving the polymer in water is not particularly limited, and it may be performed either after the reaction or at a stage during the course of the multistage method. For example, when dissolving the polymer in water at the stage of an NCO terminated prepolymer, the aqueous polyurethane resin (D) is obtained by dissolving the polymer in water while extending the chain with water and/or a polyamine.

When using an organic solvent inert to the isocyanate, solvent removal may be carried out after dissolving the polymer in water.

As the aqueous polyurethane resin (D), a commercially available product may be used. Examples of the commercially available product include Neo Rez Series, which are aqueous polyurethane resins available from Kusumoto Chemicals, Ltd., HUX Series, which are aqueous polyurethane resins available from ADEKA Corporation, and UCOAT Series, PERMARIN Series, and U-Prene Series, which are aqueous polyurethane resins available from Sanyo Chemical Industries, Ltd.

In addition to the components (A), (B), (C) and (D), other aqueous resins may be contained, if necessary, in the primer coating composition of the present invention. Examples of the other aqueous resins include aqueous acrylic resins, acrylic emulsions, and amino resin emulsions. The aqueous resins may be used as a pigment dispersant described below.

Such other resin can be used in an arbitrary amount, provided that functions (water resistance, chipping resistance, etc.) of the primer coating composition of the present invention are not damaged.

The primer coating composition of the present invention may further contain other materials that are usually added as coating materials, such as pigments, surfactants, neutralizing agents, stabilizers, thickeners, defoaming agents, surface conditioners, leveling agents, pigment dispersants, ultraviolet absorbers, antioxidants, inorganic fillers such as silica, conductive fillers such as conductive carbon, conductive filler, and metal powder, organic modifiers, and plasticizers, if necessary.

Examples of the thickener include nonionic associated urethane thickener, alkali-swelled thickener, and bentonite that is an inorganic intercalation compound. Examples of the pigment include color pigments such as inorganic pigments, for example, titanium oxide, carbon black, iron oxide, chromium oxide and iron blue, and organic pigments, for example, azo pigments, anthracene pigments, perylene pigments, quinacridone pigments, indigo pigments and phthalocyanine pigments; extender pigments such as talc and precipitated barium sulfate; conductive pigments such as conductive carbon and whisker coated with antimony-doped tin oxide; and non-colored or colored metallic bright materials such as metals or alloys of aluminum, copper, zinc, nickel, tin, and aluminum oxide.

Examples of the pigment dispersant include aqueous acrylic resins; acid block copolymers such as BYK-190 (produced by BYK-Chemie); styrene-maleic acid copolymers; acetylene-diol derivatives such as Surfynol GA and Surfynol T324 produced by Air Products and Chemicals, Inc.; and water-soluble carboxymethylcellulose acetate butylate such as CMCAB-641-0.5 produced by Eastman Chemical Company. By using the pigment dispersant, a stable pigment paste can be prepared. Examples of the defoaming agent include Surfynol 104 PA and Surfynol 440 produced by Air Products and Chemicals, Inc.

In the primer coating composition of the present invention, a mass ratio (PWC) of conductive black based on the resin solid content contained in the coating composition is preferably 1 to 5%. When the mass ratio of conductive black is within the above range, a coating film can exhibit good conductivity. Here, the "resin solid content" means the total amount of film-forming resin(s) contained in the primer coating composition. When the content (PWC) of conductive black is less than 1%, the hiding property of a coating film to be obtained may deteriorate. When the content (PWC) of conductive black exceeds 5%, the effect along with the increase in the content is not exerted and the cost may be extremely high.

The primer coating composition of the present invention can be prepared by mixing the respective components constituting the coating composition with a means that is usually used. The primer coating composition of the present invention is produced by mixing the above-described (A) to (D) and other components to be used if necessary. In particular, when a primer coating composition containing a pigment is produced, a method in which a pigment-dispersed paste containing a pigment and a pigment dispersant is prepared in advance and then the primer coating composition is produced is high in production efficiency.

<Method for Forming Coating Film>

Furthermore, the present invention provides a method for forming a coating film, comprising the step of applying the primer coating composition to an object to be coated, and heating the primer coating composition to 70 to 120° C. to form a primer coating film.

The primer coating composition of the present invention can form a coating film at a lower temperature as compared with the conventional primer coating compositions and can also provide a coating film having excellent coating film properties. While the coating film formation may be carried out by either natural drying or forced drying, the forced drying is more preferred from the viewpoint of application efficiency. The forced drying may be carried out by any of, for example, hot air drying, near-infrared drying, and electromagnetic wave drying. The drying temperature is chosen within a temperature range in which thermal deformation of a substrate does not occur, and it is preferably 120° C. or lower. The drying time generally depends on the drying temperature and the wind speed in a drying furnace and is appropriately set in view of energy efficiency. The heating condition in the coating film forming step is preferably a film forming temperature of 70 to 120° C., and more preferably 70 to 100° C.

<Object to Be Coated>

Examples of the object to be coated in the above method include steel plates of metal such as iron, steel, stainless steel, aluminum, copper, zinc, and tin and alloys thereof; resins such as polyethylene resin, EVA resin, polyolefin resins (polyethylene resin, polypropylene resin, etc.), vinyl chloride resin, styrol resin, polyester resins (including PET resin, PBT resin, etc.), polycarbonate resin, acrylic resin, acrylonitrile-butadiene-styrene (ABS) resin, acrylonitrile-styrene (AS) resin, polyamide resin, acetal resin, phenol resin, fluororesin, melamine resin, urethane resin, epoxy resin, and polyphenylene oxide (PPO); and organic-inorganic hybrid materials. These may have been molded.

The steel plate may be in a state where an electrodeposition coating film is formed after being subjected to a chemical conversion treatment. Examples of the chemical conversion treatment include zinc phosphate conversion, zirconium conversion, and chromic acid conversion. Examples of the electrodeposition coating film include electrodeposition coating films obtained by electrodeposition using a cationic electrodeposition coating composition and an anionic electrodeposition coating composition.

The primer coating composition of the present invention has an advantage that a primer coating film having excellent adhesion can be formed also on a steel plate provided with an electrodeposition coating film.

The resin may, if necessary, have been subjected to vapor cleaning using an organic solvent or may have been subjected to cleaning using a neutral detergent.

The primer coating composition of the present invention can form a primer coating film in the above-mentioned temperature range and exhibits good adhesion to both a steel plate part and a resin part. Therefore, the object to be coated to which the primer coating composition of the present invention can be suitably applied may be, for example, an object to be coated including a steel plate part and a resin part. The primer coating composition of the present invention is applied to the object to be coated to form a coating film, so that it becomes possible to form a coating film having good physical properties at both the resin part and the steel plate part without applying heat by which thermal distortion of the resin part will be caused. That is, by use of the primer coating composition of the present invention, a common coating composition can be applied even to different materials, namely, resin and steel plate. This offers an advantage that the hues of the coating films to be formed can be matched at a higher level.

Examples of other object to be coated that is suitable as the object to be coated to which the primer coating composition of the present invention is applied include industrial machines and construction machines. Industrial machines and construction machines are generally large and have a feature that their constituting base materials (steel plates) are thick as compared with automobile bodies in order to withstand a large load. Therefore, when such an industrial machine or a construction machine is the object to be coated, the object to be coated is large in heat capacity and there is a problem that heat is not transferred sufficiently to the object to be coated in a heating oven. The primer coating composition of the present invention is characterized in that it is curable at low temperatures and in that a coating film having high adhesion can be obtained even when the coating composition is cured at low temperatures. Therefore, the primer coating composition of the present invention can be used suitably also for application to objects to be coated which are large in heat capacity and difficult to be subjected to high-temperature heat curing treatment after application, namely, industrial machines and construction machines. In the application to the objects to be coated, there is an embodiment in which the primer coating composition of the present invention is applied by an application method usually used by those skilled in the art. Then the composition is heated, for example, at 70 to 120° C. for 10 minutes to 2 hours, thereby forming a primer coating film.

The method for applying the primer coating composition to the object to be coated is not particularly limited and may be a method in which the composition is applied by spray coating such as air spray or airless spray, bell coating, disk coating, curtain coating, shower coating, or brush coating and then the resulting primer coating film is dried.

A dry film thickness of the primer coating composition is preferably 5 to 30 μm. When the dried film thickness is less than 5 μm, the film may be too thin and there may be a tendency that a continuous uniform film cannot be obtained. When the dried film thickness is more than 30 μm, water resistance, etc. may tend to deteriorate.

<Method for Forming Coating Film>

Furthermore, the present invention provide a method for forming a coating film, comprising a step of forming at least one coating film selected from an intermediate coating film, a base coating film and a clear coating film on the primer coating film formed from the primer coating composition according to the present invention.

In another embodiment, the method for forming a coating film of the present invention may comprise:

a first coating step of applying an intermediate coating composition onto the primer coating film obtained through application and drying of the primer coating composition to form a first coating film; and a second coating step of applying an aqueous base coating composition onto the first coating film to form a second coating film.

The intermediate coating composition and the aqueous base coating composition can be applied by an application method usually used. For example, when the intermediate coating composition and the aqueous base coating composition are applied to an automobile body, they can be applied by multi-stage application, preferably two stage application with use of air-electrostatic spray, or alternatively, there can be used an application method combining air electrostatic spray and a rotary atomization type electrostatic applicator, which is so-called "μμ (micro micro) bell", "μ (micro) bell", "metallic bell" or the like, in order to improve the appearance of a resulting coating film.

The thickness of the coating film of the aqueous intermediate coating composition may be chosen appropriately according to the desired use. The film thickness is preferably, for example, 15 to 35 μm, and more preferably 15 to 30 μm.

The thickness of the coating film of the aqueous base coating composition can be chosen appropriately according to the desired use. The film thickness is preferably, for example, 10 to 30 μm.

The method for forming a coating film of the present invention also includes an embodiment in which in a state where the second coating film is still uncured, a clear coating composition is further applied, thereby forming a clear coating film, and then an uncured multilayer coating film is cured. This method can omit a baking drying oven and therefore is preferable from economical viewpoint and environmental protection viewpoint.

The intermediate coating composition and the aqueous base coating composition are not particularly limited, and those known in the art can be used.

Preferable examples of the intermediate coating composition include aqueous intermediate coating compositions containing an aqueous resin having a hydroxyl group and a carboxyl group, a polyisocyanate compound, and a hydrophilicized-modified carbodiimide compound.

Preferable examples of the aqueous base coating composition include aqueous base coating compositions containing an aqueous resin having a hydroxyl group and a carboxyl group, a hydrophilicized-modified carbodiimide compound, a water-dispersible blocked polyisocyanate compound, and an aqueous polyurethane resin.

As the aqueous resin having a hydroxyl group and a carboxyl group contained in the aqueous intermediate coating composition and the aqueous base coating composition, an acrylic resin having a hydroxyl value of 80 to 200 mgKOH/g and an acid value of 10 to 40 mgKOH/g in terms of resin solid content and/or a polyester resin having a hydroxyl value of 80 to 200 mgKOH/g and an acid value of 10 to 40 mgKOH/g in terms of resin solid content can be used.

As the hydrophilicized-modified carbodiimide compound contained in the aqueous intermediate coating composition and the aqueous base coating composition, a hydrophilicized-modified carbodiimide to be used for preparing the primer coating composition can be used. Furthermore, a content of the hydrophilicized-modified carbodiimide compound (C) may be adjusted to 1 to 9% by mass based on the resin solid content of the aqueous coating composition.

Examples of the polyisocyanate compound contained in the intermediate coating composition include polyisocyanate compounds such as aromatic diisocyanates including tolylene diisocyanate (TDI), 4,4'-diphenylmethane diisocyanate (MDI), xylylene diisocyanate (XDI), and metaxylylene diisocyanate (MXDI); aliphatic diisocyanates including hexamethylene diisocyanate (HDI); alicyclic diisocyanates including isophorone diisocyanate (IPDI) and hydrogenated MDI; compounds resulting from such diisocyanate compounds by reducing their volatility and thereby converting them into less toxic forms; adducts of such diisocyanate compounds, including biurets, uretdiones, and isocyanurates; relatively low-molecular-weight urethane prepolymers; and aqueous dispersions of such polyisocyanate compounds (those prepared by introducing a hydrophilic group, and those prepared by mixing a surfactant to be so-called self-emulsified).

As the water-dispersible blocked polyisocyanate compound contained in the aqueous base coating composition, there can be used a water-dispersible blocked polyisocyanate compound prepared by reacting a malonic diester with the above-mentioned polyisocyanate and subsequently reacting the resulting reaction product with an organic amine compound. A content of the water-dispersible blocked polyisocyanate compound contained in the aqueous base coating composition is preferably 10 to 25% by mass based on the resin solid content of the aqueous base coating composition.

As the aqueous polyurethane resin to be contained in the aqueous base coating composition, an aqueous polyurethane resin to be used for the preparation of the primer coating composition can be used. A content of the aqueous polyurethane resin (D) is preferably 10% by mass or more and 50% by mass or less in terms of the resin solid content of the aqueous base coating composition.

Another preferred example of the aqueous base coating composition includes an aqueous base coating composition containing an aqueous resin having a hydroxyl group and a carboxyl group, a melamine resin, a weak acid catalyst, and an aqueous polyurethane resin.

As the aqueous resin having a hydroxyl group contained in the aqueous base coating composition, an acrylic resin having a hydroxyl value of 80 to 200 mgKOH/g in terms of resin solid content and/or
a polyester resin having a hydroxyl value of 80 to 200 mgKOH/g in terms of resin solid content can be used, and the acrylic resin and/or the polyester resin may have an acid value of 10 to 40 mgKOH/g.

Preferably, the melamine resin has an average imino group content of 1.0 group or more and an average methylol group content of 0.5 groups or more per melamine nucleus, and
a mass ratio of the aqueous resin to the melamine resin contained in the aqueous base coating composition is aqueous resin/melamine resin=0.7 to 3 in terms of solid content, and a content of the weak acid catalyst is 0.1 to 10.0 parts by mass based on 100 parts by mass of the solid mass of the aqueous resin and the melamine resin (aqueous resin+ melamine resin) contained in the aqueous base coating composition.

The aqueous polyurethane resin has a glass transition point (Tg) of −50° C. or less, and the aqueous polyurethane resin used for preparing the primer coating composition can be used as the aqueous polyurethane resin.

The aqueous intermediate coating composition and the aqueous base coating composition can be prepared by methods usually used by persons in the art.

In the case of forming a multilayer coating film by using the aqueous intermediate coating composition and the aqueous base coating composition, there is an advantage that a curing reaction proceeds well even under heating conditions of low temperature conditions (e.g., heating conditions at 120° C. or less), so that a cured coating film having excellent coating film properties can be obtained. On the other hand, in the case of using the primer coating composition of the present invention, an embodiment in which a multilayer coating film is formed at a temperature of 120° C. or more is not excluded. For example, a multilayer coating film may be formed at 120 to 130° C. according to the type and shape of an object to be coated.

Examples of the clear coating composition that can be used suitably in the above coating step include a urethane clear coating composition. Examples of the urethane clear coating composition include clear coating compositions containing a hydroxyl group-containing resin and an isocyanate compound curing agent. The isocyanate compound as a curing agent is not particularly limited, and examples thereof include aliphatic isocyanates such as trimethylene diisocyanate, tetramethylene diisocyanate, pentamethylene diisocyanate, hexamethylene diisocyanate (HDI), and trimethylhexamethylene diisocyanate; aliphatic cyclic isocyanates such as 1,3-cyclopentane diisocyanate, 1,4-cyclohexane diisocyanate, and 1,2-cyclohexane diisocyanate; aromatic isocyanates such as xylylene diisocyanate (XDI), 2,4-tolylene diisocyanate (TDI), and 2,6-tolylene diisocyanate; alicyclic isocyanates such as isophorone diisocyanate (IPDI) and norbornane diisocyanate; multimers such as biuret type and nurate type of these isocyanates; and mixtures thereof.

The hydroxyl value of the hydroxyl group-containing resin is preferably within a range of 20 to 200 mgKOH/g. When the hydroxyl value exceeds the upper limit, the water resistance of a coating film will deteriorate, and when the hydroxyl value is less than the lower limit, the curability of a coating film will deteriorate. The lower limit is more preferably 30 mgKOH/g, and the upper limit is more preferably 180 mgKOH/g.

The number-average molecular weight of the hydroxyl group-containing resin is preferably within a range of 1,000 to 20,000. When the number-average molecular weight is less than 1,000, the workability and the curability may be insufficient. When the number-average molecular weight exceeds 20,000, a nonvolatile portion during coating will be decreased and the workability may deteriorate. The lower limit is more preferably 2,000 and the upper limit is more preferably 15,000.

Moreover, the hydroxyl group-containing resin preferably has an acid value within a range of 2 to 30 mgKOH/g. When the acid value exceeds the upper limit, the water resistance of a coating film will deteriorate, and when the acid value is less than the lower limit, the curability of a coating film will deteriorate. The lower limit is more preferably 3 mgKOH/g, and the upper limit is more preferably 25 mgKOH/g.

A content of the isocyanate compound relative to the hydroxyl group-containing resin may be chosen suitably within a range usually used by those skilled in the art. For example, it is preferable to use the isocyanate compound in such an amount that an equivalent ratio of isocyanate groups (NCO) to hydroxyl groups (OH) (NCO/OH) falls within the range of 0.5 to 1.7. The lower limit is more preferably 0.7, and the upper limit is more preferably 1.5.

For example, an aqueous coating composition having the following constitution can be used as the intermediate coating composition:
An aqueous coating composition containing:
(i) an aqueous resin having a hydroxyl group and a carboxyl group,
(ii) a water-dispersible blocked polyisocyanate compound,
(iii) a hydrophilicized-modified carbodiimide compound, and
(iv) an aqueous polyurethane resin.

In one embodiment, the above aqueous coating composition has a content of the aqueous polyurethane resin of 15% by mass or more in terms of the resin solid content of the aqueous coating composition.

In one embodiment, the content of the aqueous polyurethane resin is 30% by mass or more and 40% by mass or less in terms of the resin solid content of the aqueous coating composition.

In one embodiment, the content of the aqueous polyurethane resin is 15% by mass or more and less than 30% by mass in terms of the resin solid content of the aqueous coating composition.

In one embodiment, a content of the water-dispersible blocked polyisocyanate compound is 10 to 25% by mass in terms of the resin solid content of the aqueous coating composition, and a content of the hydrophilicized-modified carbodiimide compound is 1.5 to 7% by mass in terms of the resin solid content of the aqueous coating composition.

In one embodiment, a mass ratio of the content of the water-dispersible blocked polyisocyanate compound to the content of the hydrophilicized-modified carbodiimide compound in terms of the resin solid content of the aqueous coating composition is preferably water-dispersible blocked polyisocyanate compound hydrophilicized-modified carbodiimide compound=25:1 to 1.25:1.

The components described in this description can be used as the respective components including the hydrophilicized-modified carbodiimide compound and the aqueous polyurethane resin.

A method for producing the clear coating composition is not particularly limited and a method well-known to those skilled in the art may be used. The clear coating composition to be used may be a commercially available product. Examples of the commercially available product include Polyure Excel O-1100 Clear and O-1200 Clear (produced by Nippon Paint Automotive Coatings Co., Ltd., isocyanate-curing type clear coating compositions).

When using the clear coating composition, a multilayer coating film can be formed by applying the primer coating composition of the present invention, thereby forming an uncured coating film (including both an embodiment to form a single coating film and the above-mentioned embodiment to form a first coating film and a second coating film), and then applying the clear coating composition by wet-on-wet, and subsequently baking and curing the clear coating composition at 70 to 120° C., preferably 70 to 100° C., for 10 to 30 minutes.

On the other hand, the primer coating composition of the present invention does not exclude an embodiment in which the film is cured at a temperature of 120° C. or more. For example, the film may be cured at 120 to 130° C. depending on the type and shape of the object to be coated.

In the present invention, according to the material of the object to be coated, a clear coating composition other than the above-mentioned urethane clear coating composition can be used. For example, an acid epoxy curable type clear coating composition, an acrylic-melamine curable type clear coating composition, etc. may be used. Examples of such clear coating compositions include "Macflow O-570 Clear" and "Macflow O-1820 Clear" available from Nippon Paint Automotive Coatings Co., Ltd., which are clear coating compositions containing a polyepoxide and a polyacid, and "Super rack O-100 Clear" (trade name) available from Nippon Paint Automotive Coatings Co., Ltd., which is a clear coating composition containing an acrylic resin and melamine curing agent. The heat curing conditions for the case of using such clear coating compositions may be chosen appropriately according to the composition of the respective clear coating compositions.

As a method for applying the clear coating composition, the above-described known coating method can be used, and for example, the composition can be applied with an air spray, electrodeposition, or the like. The clear coating composition is preferably applied so that the dry film thickness is generally 10 to 80 μm, preferably 20 to 50 μm.

EXAMPLES

The present invention will be described more specifically with reference to the following examples, but the present invention is not limited to the examples. In the examples, "parts" and "%" are on a mass basis unless otherwise indicated.
<Materials Used>

Production Example (A)-1 Production of Aqueous Non-Chlorinated Polyolefin-Based Resin (A-1)

Preparation of Polypropylene AP-1

In a 1000 ml round-bottom flask were placed 110 ml of demineralized water, 22.2 g of magnesium sulfate heptahydrate and 18.2 g of sulfuric acid, followed by dissolving under stirring. In this solution, 16.7 g of commercially available granulated montmorillonite was dispersed, the mixture was heated to 100° C., and stirred for hours. Thereafter, the mixture was cooled to room temperature, and a resulting slurry was filtered to collect wet cake. The cake collected was made into a slurry again with 500 ml of demineralized water in a 1000 ml round-bottom flask and then filtered. This operation was repeated twice. The cake finally obtained was dried overnight at 110° C. under a nitrogen atmosphere to obtain 13.3 g of chemically treated montmorillonite.

To 4.4 g of the chemically-treated montmorillonite thus obtained, 20 ml of a solution of triethylaluminum in toluene (0.4 mmol/ml) was added, and the mixture was stirred at room temperature for 1 hour. To this suspension was added 80 ml of toluene, and after stirring, the supernatant was removed. After repeating this operation twice, toluene was added to obtain a clay slurry (slurry concentration=99 mg clay/ml).

In another flask was placed 0.2 mmol of triisobutylaluminum, and 19 ml of the clay slurry thus obtained and 131 mg (57 μmol) of a dilute solution of dichloro[dimethylsilylene(cyclopentadienyl) (2,4-dimethyl-4H-5,6,7,8-tetrahydro-1-azulenyl)hafnium] in toluene was added thereto, and the mixture was stirred at room temperature for 10 minutes to obtain a catalyst slurry.

Then, 11 L of toluene, 3.5 mmol of triisobutylaluminum and 2.64 L of liquid propylene were introduced into an induction-stirring-type autoclave having an internal volume of 24 liters. The whole amount of the catalyst slurry was introduced at room temperature, the temperature was raised to 67° C., and then stirring was continued for 2 hours at that temperature while constantly keeping, during polymerization, the total pressure at 0.65 MPa and the hydrogen concentration at 400 ppm. After completion of the stirring, polymerization was stopped by purging unreacted propylene. The autoclave was opened and the solution of the polymer in toluene was collected in its entirety. When the solvent and the clay residue were removed, 11 kg of a solution of 10.9% by mass polypropylene in toluene (1.20 kg of polypropylene) was obtained. The polypropylene AP-1 thus obtained had a weight-average molecular weight Mw of 300,000 (in terms of polystyrene) and a degree of crystallinity of its PP portion of 45%.

Production of Maleic Anhydride-Modified Polypropylene APM-1

A glass flask equipped with a reflux condenser, a thermometer and a stirrer was charged with 400 g of the obtained polypropylene AP-1 and 600 g of toluene, and the atmosphere within the flask was replaced with nitrogen gas and the temperature of the mixture was raised to 110° C. After raising the temperature, 100 g of maleic anhydride was added, and 30 g of t-butyl peroxyisopropyl monocarbonate (PERBUTYL I (PBI) produced by NOF Corporation) was added, and the reaction was carried out by continuous stirring at that temperature for 7 hours. After completion of the reaction, the system was cooled to near room temperature, acetone was added, and the polymer precipitated was collected by filtration. Furthermore, precipitation and filtration were repeated using acetone, and a finally obtained polymer was washed with acetone. The polymer obtained after the washing was dried under reduced pressure to obtain a maleic anhydride-modified polymer APM-1 in the form of a white powder. Infrared absorption spectrum measurement of this modified polymer revealed that the content (grafting ratio) of maleic anhydride groups was 3.7% by mass (0.37 mmol/g). The weight-average molecular weight was 140,000.

Production of Aqueous Maleic Anhydride-Modified Polypropylene APMW-1

A glass flask equipped with a reflux condenser, a thermometer and a stirrer was charged with 100 g of the obtained maleic anhydride-modified polypropylene APM-1 (weight-average molecular weight: 140,000, maleic anhydride graft ratio: 3.7%) and 150 g of tetrahydrofuran, both of which were heated to 65° C. for dissolution. Then, 5.8 g (2 chemical equivalents) of dimethylethanolamine was added and phase inversion was performed by dropping 400 g of ion-exchanged water at 60° C. while keeping the temperature at 65° C., and then, 0.1 g of hydroquinone was added as an antioxidant and the temperature was raised slowly to distill off tetrahydrofuran, and thus a milky white dispersion was obtained. By adding ion-exchanged water, the solid content of the dispersion was adjusted such that the resin solid content became 20% by mass. The particle diameter of this aqueous dispersion was 0.1 µm or less.

Production Example (A)-2 Production of Acid Anhydride-Modified Chlorinated Polyolefin Resin (A-2)

A reaction vessel equipped with a stirring blade, a thermometer, a dropping device, a temperature controller, a nitrogen gas inlet tube, and a cooling tube was charged with 288 parts of a maleic anhydride-modified polyolefin "SUPERCHLON 892LS" (Nippon Paper Industries Co., Ltd., chlorine content: 22%, weight-average molecular weight: 70,000 to 80,000), 62 parts of a surfactant "EMULGEN 920" (produced by Kao Corporation), 74 parts of an aromatic hydrocarbon solvent "SOLVESSO 100" (produced by Exxon), and 32 parts of carbitol acetate, and the temperature of the mixture was raised to 110° C. and heated at this temperature for 1 hour to dissolve the resin, etc., and then cooled to 100° C. or lower. Subsequently, 710 parts of ion-exchanged water in which 6 parts of dimethylethanolamine was dissolved was added dropwise over 1 hour with stirring, followed by phase inversion emulsification. Thereafter, the mixture was cooled to room temperature (25° C.) and filtered through a 400-mesh wire mesh to obtain a maleic anhydride-modified chlorinated polyolefin emulsion. The nonvolatile content of this emulsion was 30% by mass. The acid anhydride-modified chlorinated polyolefin resin obtained in Production Example (A)-2 was an acid anhydride-modified chlorinated polypropylene-based resin.

Aqueous Epoxy Resin (B)

As the aqueous epoxy resin (B), EPIREZ 5003W55 (produced by JAPAN CHEMTECH LTD., aqueous epoxy resin) was used.

Production of Hydrophilicized-Modified Carbodiimide Compound (C)

Production Example (C)-1 Production of Hydrophilicized-Modified Carbodiimide Compound (C-1)

By reacting 700 parts of 4,4-dicyclohexylmethane diisocyanate and 7 parts of 3-methyl 1-phenyl 2-phospholene-1-oxide at 170° C. for 7 hours, there was obtained a carbodiimide compound with the structure represented by the above formula (a) having three carbodiimide groups in one molecule and having isocyanate groups at its both ends.

Next, to 180 parts of the produced 4,4-dicyclohexylmethanecarbodiimide having isocyanate ends were added 95 parts of PTMG-1000 (polytetramethylene glycol having a number-average molecular weight of 1,000 produced by Mitsubishi Chemical; repeat number of tetramethylene oxide calculated from number-average molecular weight was 13.6) and 0.2 parts of dibutyltin dilaurate, and the mixture was then heated to 85° C. and held for 2 hours.

Subsequently, 86.4 parts of Methyl Poly Glycol 130 (polyethylene glycol monomethyl ether produced by Nippon Nyukazai Co., Ltd.; repeat number of ethylene oxide calculated from hydroxyl value of 130 mgKOH/g was 9) was added and then the mixture was held at 85° C. for 3 hours. After confirming disappearance of a peak of NCO by IR measurement, the reaction was finished, followed by cooling to 60° C., and then deionized water was added, and thus an aqueous dispersion of a hydrophilicized-modified carbodiimide compound (C-1) having a resin solid content of 40% by mass was obtained. The resulting hydrophilicized-modified carbodiimide compound was a compound represented by the above formula (I).

Production Example (C)-2 Production of Hydrophilicized-Modified Carbodiimide Compound (C-2)

To 90 parts of the 4,4-dicyclohexylmethanecarbodiimide having isocyanate ends produced in Production Example (C)-1 were added 120 parts of polypropylene glycol monobutyl ether having an average repeat number of 19, 43.2 parts of Methyl Poly Glycol 130, and 0.07 parts of dibutyltin dilaurate, and their temperature was held at 80° C. until absorption of NCO disappeared in an IR spectrum. After cooling to 60° C., deionized water was added and thus an aqueous dispersion of a hydrophilicized-modified carbodiimide compound (C-2) having a resin solid content of 25% was obtained. The resulting hydrophilicized-modified carbodiimide compound was a compound represented by the above formula (III).

In the resulting hydrophilicized-modified carbodiimide compound, the ratio of (i) a structure resulting from elimination of a hydroxyl group from polyethylene glycol monoalkyl ether and (ii) a structure resulting from elimination of a hydroxyl group from polypropylene glycol monoalkyl ether was (i):(ii)=1.0:1.0.

Production Example (C)-3 Production of Hydrophilicized-Modified Carbodiimide Compound (C-3)

By reacting 393 parts of 4,4-dicyclohexylmethane diisocyanate with 8 parts of 3-methyl-1-phenyl-2-phospholene-1-oxide at 180° C. for 16 hours, obtained was a carbodiimide compound having four carbodiimide groups in one molecule and having isocyanate groups at both ends. Here, 130 parts of polyethylene glycol monomethyl ether having an oxyethylene group repeat number of 9 and 0.2 parts of dibutyltin dilaurate were added, followed by heating at 90° C. for 2 hours, and thus a carbodiimide compound with a structure represented by the following formula, the carbodiimide compound having an isocyanate group and a hydrophilic group at its ends, was obtained. In addition, 300 parts of GP-3000 (trihydric polyol having a structure in which 17 mol, in average, of propylene oxide was added to respective three hydroxyl groups of glycerol, produced by Sanyo Chemical Industries, Ltd.) was added and was reacted at 90° C. for 6 hours. After confirming disappearance of a peak of NCO by IR measurement, the reaction was finished and thus a hydrophilicized-modified carbodiimide compound (C-3) was obtained. Deionized water was added thereto and thus an aqueous dispersion of the hydrophilicized-modified carbodiimide compound (C-3) having a resin solid content of 30% by mass was obtained. The resulting hydrophilicized-modified carbodiimide compound was a compound represented by the above formula (II).

Aqueous Polyurethane Resin (D)

The aqueous polyurethane resins (D) described below were used.
Type A: N9603 (produced by Kusumoto Chemicals, Ltd.), solid concentration: 34%, Tg: −10° C., elongation at break: 12%
Type B: HUX-232 (produced by ADEKA Corporation), solid concentration: 30%, Tg: −18° C., elongation at break: 130%
Type C: N800 (produced by Sanyo Chemical Industries, Ltd.), solid concentration: 38%, Tg: −60° C., elongation at break: 312%
Type D: PERMARIN U150 (produced by Sanyo Chemical Industries, Ltd.), solid concentration: 30%, Tg: −60° C., elongation at break: 610%

As electrically conductive black, product code: KETJENBLACK EC600JD produced by Lion Corporation was used.
(Production of Coloring Pigment Paste)
After preliminarily mixing 14.1 parts of a commercially available dispersant "Disperbyk 190" (produced by BYK Chemie), 2.4 parts of Surfynol T324 (produced by Air Products and Chemicals, Inc.), 1.9 parts of Surfynol 440 (produced by Air Products and Chemicals, Inc.), 28.9 parts of ion-exchanged water, 2.3 parts of KETJENBLACK EC600JD (produced by Lion Corporation), 43.5 parts of Ti-Pure-R960 (produced by DuPont) and 6.8 parts of Nipsil 50B (produced by Tosoh Silica Corporation), a bead medium was added to the mixture in a paint conditioner, and mixed and dispersed at room temperature until the particle size reached 5 µm or less, and then the bead medium was removed by filtration and thus a coloring pigment paste was obtained.

(Production of Primer Coating Composition)

Into a vessel equipped with a stirrer were added dropwise one after another 125 parts (resin solid content: 20% by mass) of the aqueous non-chlorinated polyolefin-based resin (A-1) prepared in Production Example (A)-1, 60 parts (resin solid content: 50% by mass) of EPIREZ 6006W as the aqueous epoxy resin (B), 12.5 parts (resin solid content: 40% by mass) of the hydrophilicized-modified carbodiimide compound (C-1) prepared in Production Example (C)-1, 133.3 parts (resin solid content: 30% by mass) of a polyurethane Type D as the aqueous polyurethane resin (D), 98.5 parts (solid content: 71.1% by mass) of the produced pigment paste, 4.7 parts (solid content: 100% by mass) of Dynol 604 (produced by Air Products and Chemicals, Inc.) as a defoaming agent, 6.7 parts (solid content: 30% by mass) of Viscalex HV-30 (produced by BASF) as a thickener, and 0.5 parts (solid content: 100% by mass) of dimethylethanolamine (produced by KISHIDA CHEMICAL Co., Ltd., a neutralizing agent), and these components were then stirred for 1 hour. Thus, a primer coating composition was obtained. Details on the blending amounts and the physical properties of the respective components are described in Table 1 (the following table). The use amounts of the components included in the table are represented in the amounts of solids.

Examples 2 to 11

In Examples 2 to 11, primer coating compositions were prepared in the same manner as in Example 1 except that the respective compositions were blended in the ratios shown in Table 1 (the following table).

Comparative Examples 1 to 4

In Comparative Examples 1 to 4, primer coating compositions were prepared in the same manner as in Example except that no hydrophilicized-modified carbodiimide compound (C) was used and the respective compositions were blended in the ratios shown in Table 1 (the following table).

Pre-Preparation of Intermediate Coating Composition and Aqueous Base Coating Composition Production Example (In)-1 Production of Acrylic Emulsion Having Hydroxyl Group and Carboxyl Group (AcEm-1)

A reaction vessel equipped with a stirrer, a nitrogen inlet tube, a temperature controller, a condenser, and a dropping funnel was charged with 2,000 parts of deionized water, and then was heated to 80° C. with stirring under a nitrogen atmosphere.

A pre-emulsion prepared by adding to 1,000 parts of deionized water 103 parts of styrene, 290 parts of n-butyl methacrylate, 280 parts of n-butyl acrylate, 302 parts of hydroxyethyl acrylate, 26 parts of acrylic acid, 3 parts of dodecyl mercaptan, and 100 parts of LATEMUL PD-104 (produced by Kao Corporation. 20% aqueous solution) as an emulsifier and then emulsifying them was dropped over 2 hours together with an aqueous initiator solution prepared by dissolving 3 parts of ammonium persulfate in 300 parts of deionized water.

After the completion of the dropping, the reaction was continued at 80° C. for 1 hour, followed by cooling, and 8.2 parts of N,N-dimethylaminoethanol was added and thus an acrylic emulsion having a resin solid content of 30% by mass was obtained. The hydroxyl value of the acrylic emulsion, in terms of resin solid content, calculated from the monomer composition was 130 mgKOH/g and the acid value was 20 mgKOH/g. The acrylic resin in the resulting acrylic emulsion had a number-average molecular weight of 45,000 as determined by GPC measurement after removing water.

Production Example (ln)-2 Production of Polyester Aqueous Dispersion Having Hydroxyl Group and Carboxyl Group (PE-DP)

A reaction vessel equipped with a stirrer, a nitrogen inlet tube, a temperature controller, a condenser, and a decanter was charged with 250 parts of trimethylolpropane, 824 parts of adipic acid, and 635 parts of cyclohexanedicarboxylic acid, then the mixture was heated to 180° C., and then a condensation reaction was carried out until no more water distilled out. After cooling to 60° C., 120 parts of phthalic anhydride was added and the mixture was heated to 140° C. and held for 60 minutes, and thus a polyester resin having a number-average molecular weight of 2,000 as determined by GPC measurement was obtained. 59 parts of dimethyl-aminoethanol (corresponding to 80% of the acid value of the resin (neutralization ratio: 80%)) was added at 80° C., and 1920 parts of deionized water was further added, followed by stirring, and thus a polyester aqueous dispersion having a resin solid content of 45% by mass was obtained. The hydroxyl value of the aqueous polyester dispersion in terms of resin solid content was 90 mgKOH/g and the acid value was 35 mgKOH/g.

Production Example (Ln)-3 Production of Coloring Pigment Paste

After preliminarily mixing 9.2 parts of a commercially available dispersing agent "Disperbyk 190" (produced by BYK-Chemie), 17.8 parts of ion-exchanged water, and 73.0 parts of rutile type titanium dioxide, a bead medium was added to the mixture in a paint conditioner, and mixed and dispersed at room temperature until the particle size reached 5 μm or less, and then the bead medium was removed by filtration and thus a coloring pigment paste was obtained.

Production Example (ln)-4 Production of Emulsion Resin Having Hydroxyl Value of Less than 80 mgKOH/g To reaction vessel containing 194.1 parts of ion-exchanged water were added 0.2 parts of ADEKA REASOAP NE-20 (α-[1-[(allyloxy)methyl]-2-(nonylphenoxy)ethyl]-ω-hydroxyoxyethylene, produced by ADEKA Corporation, aqueous solution having a solid content of 80% by mass) and 0.2 parts of Aqualon HS-10 (polyoxyethylene alkylpropenylphenyl ether sulfate, produced by DKS Co. Ltd.), the mixture was then heated to 80° C. with mixing and stirring under a nitrogen flow. Subsequently, a monomer mixture composed of 18.5 parts of methyl acrylate, 31.7 parts of ethyl acrylate, 5.8 parts of 2-hydroxyethyl acrylate, 10.0 parts of styrene, 4.0 parts of acrylamide, 0.3 parts of ADEKA REASOAP NE-20, 0.2 parts of Aqualon HS-10, and 70 parts of ion-exchanged water as an α,β-ethylenically unsaturated monomer mixture for the first step, and an initiator solution composed of 0.2 parts of ammonium persulfate and 7 parts of ion-exchanged water were dropped in parallel into the reaction vessel over 2 hours. After the completion of the dropping, aging was carried out at the same temperature for 1 hour.

Further, a monomer mixture composed of 24.5 parts of ethyl acrylate, 2.5 parts of 2-hydroxyethyl acrylate, 3.1 parts of methacrylic acid, 0.3 parts of Aqualon HS-10, and parts of ion-exchanged water as an α,β-ethylenically unsaturated monomer mixture for the second step, and an initiator solution composed of 0.1 parts of ammonium persulfate and 3 parts of ion-exchanged water were dropped in parallel into the reaction vessel at 80° C. over 0.5 hours. After the completion of the dropping, aging was carried out at the same temperature for 2 hours.

Subsequently, the mixture was cooled to 40° C. and was filtered with a 400 mesh filter. Further, a 10% by mass aqueous dimethylaminoethanol solution was added and the pH was adjusted to 7, and thus an emulsion resin having an average particle diameter of 110 nm, a resin solid content of 24% by mass, an acid value of 20 mgKOH/g and a hydroxyl value of 40 mgKOH/g in terms of solid content was obtained. The glass transition point was calculated to be 0° C. on the basis of the whole monomer composition.

(Production of Aqueous Intermediate Coating Composition-1)

Stirred were 158 parts (resin solid content: 30%) of the acrylic emulsion (AcEm-1) obtained in Production Example (ln)-1, and 18.7 parts (resin solid content: 45%) of the polyester aqueous dispersion (PE-DP) obtained in Production Example (ln)-2. To this was added 137.7 parts of the colored pigment paste of Production Example (ln)-3, the pH was adjusted to 8.0 with 0.01 parts of dimethylethanolamine (produced by KISHIDA CHEMICAL Co., Ltd.), and 1.0 part of ADEKA NOL UH-814N (urethane association type thickening agent, active component content: 30%, produced by ADEKA Co., Ltd., trade name) was mixed and stirred, and the mixture was stirred until it became uniform. To this were added under agitation 40.9 parts of BAYHYDUR 305 (polyisocyanate compound having an ethylene oxide group produced by Sumika Bayer Urethane Co., Ltd., ethylene oxide content: 20% by mass, isocyanate group content: 16% by mass) and 8.3 parts (resin solid content: 40% by mass) of the hydrophilicized-modified carbodiimide compound (C-1) obtained in Preparation Example (C)-1, and the mixture was stirred, so that an aqueous intermediate coating composition-1 was obtained.

(Production of Aqueous Intermediate Coating Composition-2)

A vessel equipped with a stirrer was charged with 119.67 parts (resin solid content: 30% by mass) of the hydroxyl group-containing acrylic resin emulsion (AcEm-1) prepared in Production Example (ln)-1. To this were added 25.78 parts (resin solid content: 45% by mass) of the polyester aqueous dispersion (PE-DP) prepared in Production Example (ln)-2, 100 parts (resin solid content: 30% by mass) of an aqueous polyurethane resin (type D), 24.19 parts of WM44-L70G (produced by Asahi Kasei Chemicals Corporation, solid concentration: 70.7%) as a water-dispersible blocked polyisocyanate, 13.5 parts (resin solid content: 40% by mass) of the hydrophilicized-modified carbodiimide compound prepared in Production Example 5, 122.11 parts of the pigment-dispersed paste portion prepared in Production Example 6, 68 parts of ion-exchanged water. Subsequently, the pH was adjusted to 8.0 with 0.01 parts of dimethylethanolamine (produced by KISHIDA CHEMICAL Co., Ltd.). Then, 1.0 part of ADEKA NOL UH-814N (urethane association type thickening agent, effective component content: 30%, produced by ADEKA Corporation, trade name) was mixed and stirred, and thus an aqueous intermediate coating composition-2 was obtained.

(Production of Aqueous Base Coating Composition-1)

In a vessel equipped with a stirrer, 100 parts (resin solid content: 30% by mass) of the hydroxyl group-containing acrylic resin emulsion (AcEm-1) obtained in Production Example (ln)-1 and 125 parts (resin solid content: 24% by mass) of the acrylic emulsion resin obtained in Production Example (ln)-4 were stirred and mixed, and then 21.2 parts of WM44-L70G (produced by Asahi Kasei Chemicals Corporation, solid concentration: 70.7%) as a water-dispersible blocked polyisocyanate, 12.5 parts (resin solid content: 40% by mass) of the hydrophilicized-modified carbodiimide compound prepared in Production Example (C)-1, 21 parts (solid content: 65%, PWC 12%) of Alpaste MH8801 (aluminum pigment produced by Asahi Kasei Corporation) as a luster pigment, 5 parts of an acrylic resin containing a phosphate group, and 0.3 parts of lauryl acid phosphate were added. Further, 30 parts of 2-ethylhexanol, 3.3 parts of ADEKA NOL UH-814N (thickening agent produced by ADEKA Corporation, solid content: 30%), 0.01 parts of dimethylethanolamine (produced by KISHIDA CHEMICAL Co., Ltd.), and 150 parts of ion-exchanged water were dispersed uniformly, and thus an aqueous base coating composition was obtained. The PWC of the obtained coating composition was 12.0%.

(Production of Aqueous Base Coating Composition-2)

Mixed were 116.7 parts (resin solid content: 25% by mass) of the acrylic emulsion serving as an aqueous resin obtained in Production Example (ln)-1 and 104.2 parts (resin solid content: 24% by mass) of the emulsion resin having a hydroxyl value of less than 80 mgKOH/g and obtained in Production Example (ln)-4. To the resulting mixture were added 66.7 parts (resin solid content: 30% by mass) of an aqueous polyurethane resin (Type D: PERMARIN U150 produced by Sanyo Chemical Industries, Ltd., solid concentration: 30%, Tg: −60° C., elongation at break: 610%), 21 parts (solid content: 65%, PWC 12%) of Alpaste MH8801 (aluminum pigment produced by Asahi Kasei Corporation) as a luster pigment, 5 parts of an acrylic resin containing a phosphate group, and 0.3 parts of lauryl acid phosphate. Further, 30 parts of 2-ethylhexanol, 3.3 parts of ADEKA NOL UH-814N (thickening agent produced by ADEKA Corporation, solid content: 30%), 0.01 parts of dimethylethanolamine (produced by KISHIDA CHEMICAL Co., Ltd.), 150 parts of ion-exchanged water, and 20 parts (in resin solid amount) of "CYMEL 701" produced by Allnex Japan Inc. as a melamine resin were added, and "CYCAT (registered trademark) 296-9" (weakly acidic phosphate, pKa(H2O) 1.8 or more) produced by Allnex Japan Inc. as a weak acid catalyst was added under stirring in an amount of 0.5% (solid content=only catalytically effective amount) based on the total solid contents of the acrylic emulsion as aqueous resin and the melamine resin, and then 0.5 parts of N,N-dimethylaminoethanol (neutralizing agent) was added and stirred. Thus an aqueous base coating composition was obtained.

The "CYMEL 701" used in this example was an iminomethylol type melamine resin, in which the average imino group amount per melamine nucleus was 1.0 group or more and less than 1.5 groups and the average methylol group amount was 0.5 groups or more and less than 1.0 group.

(Formation of Multilayer Coating Film)

Formation of Multilayer Coating Film on Steel Plate

Powernics 150 (trade name, cationic electrodeposition coating material produced by Nippon Paint Automotive Coatings Co., Ltd.) was electrodeposition coated on a dull steel sheet treated with zinc phosphate such that the thickness of the dry coating film was 20 µm, followed by heat-curing at 160° C. for 30 minutes and subsequent cooling, and thus a steel substrate was prepared.

Each of the primer coating compositions of Examples 1 to 11 and Comparative Examples 1 to 4 shown in Tables 1 etc. (the following table) was applied to the resulting substrate such that the thickness of the dry coating film was 10 µm. Then the primer coating compositions were dried under conditions of 70° C.×30 minutes, 75° C.×30 minutes, and 80° C.×30 minutes for the respective examples and comparative examples, and thus primer coating films were formed on the substrates.

Subsequently, the aqueous intermediate coating composition was applied to the primer coating film under drying conditions by using a rotary atomization type electrostatic applicator such that the thickness of the dry coating film was 25 µm. Then the aqueous base coating material was applied by using a rotary atomization type electrostatic applicator such that the thickness of the dry coating film was 15 µm, followed by preheating at 80° C. for minutes. The aqueous base coating composition was applied after an interval of 6 minutes from the application of the aqueous intermediate coating composition. In addition, Polyure Excel 0-1200 (trade name, produced by Nippon Paint Automotive Coatings Co., Ltd., polyisocyanate compound-containing two-components acrylic urethane-based organic solvent type clear coating composition) was applied as a clear coating composition to the coated plate by using a rotary atomization type electrostatic applicator such that the thickness of the dry coating film was 35 µm. Then these compositions were heated and cured at 80° C. for 20 minutes, and thus a specimen on which a multilayer coating film had been formed was obtained.

Formation of Multilayer Coating Film on Polypropylene Plate

The primer coating compositions of Examples 1 to 11 and Comparative Examples 1 to 4 shown in Tables 1 etc. (the following table) were applied to commercially available polypropylene materials (70 mm×150 mm×3 mm) such that the thickness of the dry coating film was 10 µm, and then the primer coating compositions were dried under conditions of 70° C.×30 minutes, 75° C.×30 minutes, and 80° C.×30 minutes for the respective examples and comparative examples, and thus primer coating films were formed on the substrates.

Subsequently, the aqueous intermediate coating composition was applied to the primer coating film under drying conditions by using a rotary atomization type electrostatic applicator such that the thickness of the dry coating film was 25 μm, and then the aqueous base coating material was applied by using a rotary atomization type electrostatic applicator such that the thickness of the dry coating film was 15 μm, followed by preheating at 80° C. for minutes. The aqueous base coating composition was applied after an interval of 6 minutes from the application of the aqueous intermediate coating composition. In addition, Polyure Excel 0-1200 (trade name, produced by Nippon Paint Automotive Coatings Co., Ltd., polyisocyanate compound-containing two-components acrylic urethane-based organic solvent type clear coating composition) was applied as a clear coating composition to the coated plate by using a rotary atomization type electrostatic applicator such that the thickness of the dry coating film was 35 μm. Then these compositions were heated and cured at 80° C. for 20 minutes, and thus a specimen on which a multilayer coating film had been formed was obtained.

The measurement of a number-average molecular weight in the examples is a value measured under the following GPC system measurement conditions.
Instrument: HLC-8220 GPC manufactured by Tosoh Corporation
Column: Shodex KF-606 M, KF-603
Flow rate: 0.6 ml/min
Detector: RI, UV 254 nm
Mobile phase: tetrahydrofuran
Standard samples: TSK STANDARD POLYSTYRENE (produced by
Tosoh Corporation), A-500, A-2500, F-1, F-4, F-20, F-80, F-700, 1-phenylhexane (produced by Aldrich)

The elongation at break of each of the aqueous polyurethane resins used in the examples and the comparative examples was measured by the following procedure.
(Measurement of Elongation at Break of Aqueous Polyurethane Resin)

95 parts (resin solid content amount) of an aqueous polyurethane resin and 5 parts by mass (resin solid content amount) of the hydrophilicized-modified carbodiimide compound (C) described in Production Example (C)-1 were mixed such that the two resin solid contents thereof was 100 parts by mass in total. In a clean environment where dusts or the like do not adhere, the mixed liquid prepared was applied onto a flat polypropylene plate uniformly with a doctor blade such that the thickness of the dry coating film was 20 μm. After leaving at rest at 20° C. for 10 minutes, the resulting plate was preheated at 80° C. for 3 minutes, thereby volatilizing water, and then was baked at 120° C. for 30 minutes, and thus a cured film was prepared. The cured film obtained was subjected to a tensile performance test at a testing temperature of −20° C. in accordance with JIS K7127 and an elongation ratio at the time of breaking (elongation at break) was measured. Measurement was performed 20 times and the average of 18 measurements except the maximum and the minimum values was taken as the elongation at break of the sample.

The following evaluations were performed for respective test pieces each containing a steel plate or a polypropylene plate as a substrate. Evaluation results are shown in Tables 1 etc. (the following table).
(Evaluation of Moisture-Resistant Adhesion)

After exposing each of the test plates to an atmosphere with a temperature of 50° C. and a humidity of 99% for 240 hours, it is dried at 20° C. for 24 hours. Then lattice-like cuts are made in the multilayer coating film of the test plate with a knife to reach the base material, so that 100 crosscuts having a size of 2 mm×2 mm are made. Subsequently, an Adhesive Cellophane Tape was affixed to each of the test plates, the tape was abruptly peeled off at 20° C., and the number of remaining crosscut coating films was counted. The relative merits of the coating film can be judged from the number of peeled crosscut sections. Even if only one crosscut section peeled, the sample is judged to be unusable. As an evaluation result, the number of crosscuts peeled was recorded.

(Moisture-Resistant Shrinkage)

After exposing each of the test plates to an atmosphere with a temperature of 50° C. and a humidity of 99% for 240 hours, the test plate is dried at 20° C. for 24 hours and then visually checked for observing changes in its appearance before and after the test. Under the following criteria, test plates with rating O or OΔ can be judged to be practically usable.
O: Almost no difference is observed in gloss and smoothness.
OΔ: Slight change is observed in gloss and smoothness.
Δ: Change is observed in gloss and smoothness.
Δx: Change is observed in both gloss and smoothness, and especially, change in gloss is remarkable.
x: Remarkable difference is observed in both gloss and smoothness.

(Evaluation of Chipping Resistance)

The test plates each with a layered coating film obtained in the examples and the comparative examples were subjected to a stepping stone test under the conditions shown below using a Gravelometer KSS-1 (produced by Suga Test Instruments Co., Ltd.).
<Test Conditions>
Stone size: 6 to 8 mm
Amount of stone: 0.7 to 0.8 g/piece
Distance: 35 cm
Shot pressure: 0.6 kg/cm$^2$
Shot angle: 45°
Test temperature: 20° C.

The test plates after the stepping stone test were evaluated visually according to the following criteria. Under the following criteria, when the score is 4 or more, the test plate can be used practically and is judged to be acceptable.
5: Almost no exfoliation is observed.
4: The exfoliated area is small, but almost no exfoliation is observed at the interface between the electrodeposition coating film and the intermediate coating film.
3: The exfoliated area is slightly large and exfoliation is observed at the interface between the electrodeposition coating film and the intermediate coating film.
2: The exfoliated area is large and exfoliation is observed at the interface between the electrodeposition coating film and the intermediate coating film.
1: The exfoliated area is large and the electrodeposition coating film is broken.

TABLE 1

| | | | Example 1 | | Example 2 | | Example 3 | |
|---|---|---|---|---|---|---|---|---|
| | | | On electrodeposition | On PP | On electrodeposition | On PP | On electrodeposition | On PP |
| Primer | Polyolefin-based resin (A-1) (Non-chlorinated) | Blending amount | 25 | | 25 | | 25 | |
| | Polyolefin-based resin (A-2) (Chlorinated) | Blending amount | 0 | | 0 | | 0 | |
| | Aqueous epoxy resin (B) | Blending amount | 30 | | 30 | | 30 | |
| | Hydrophilicized-modified carbodiimide compound (C) | Type | C-1 | | C-2 | | C-3 | |
| | | Blending amount | 5 | | 5 | | 5 | |
| | Aqueous polyurethane resin (D) | Type | D | | D | | D | |
| | | Blending amount | 40 | | 40 | | 40 | |
| | | Tg | −60 | | −60 | | −60 | |
| | | Elongation at break | 610 | | 610 | | 610 | |
| | Conductive black | PWC | 2 | | 2 | | 2 | |
| | Total amount of resin solid content | | 100 | | 100 | | 100 | |
| | Ratio [(C)/(D)] of hydrophilicized-modified carbodiimide compound (C)/aqueous polyurethane resin (D) | | 0.13 | | 0.13 | | 0.13 | |
| Intermediate coating composition | | | Intermediate coating composition-1 | | | | | |
| Aqueous base coating composition | | | Aqueous base coating composition-1 | | | | | |
| Clear | | | Polyure Excel O-1200 | | | | | |
| Performance at 70° C. × 30 minutes | Moisture-resistant adhesion (number of peeled sections) | | 0 | 0 | 0 | 0 | 0 | 0 |
| | Shrinkage after moisture resistance test | | ○ | ○ | ○ | ○ | ○ | ○ |
| | Chipping resistance | | 5 | — | 5 | — | 5 | — |
| Performance at 75° C. × 30 minutes | Moisture-resistant adhesion (number of peeled sections) | | 0 | 0 | 0 | 0 | 0 | 0 |
| | Shrinkage after moisture resistance test | | ○ | ○ | ○ | ○ | ○ | ○ |
| | Chipping resistance | | 5 | — | 5 | — | 5 | — |
| Performance at 80° C. × 30 minutes | Moisture-resistant adhesion (number of peeled sections) | | 0 | 0 | 0 | 0 | 0 | 0 |
| | Shrinkage after moisture resistance test | | ○ | ○ | ○ | ○ | ○ | ○ |
| | Chipping resistance | | 5 | — | 5 | — | 5 | — |

| | | | Example 4 | | Example 5 | |
|---|---|---|---|---|---|---|
| | | | On electrodeposition | On PP | On electrodeposition | On PP |
| Primer | Polyolefin-based resin (A-1) (Non-chlorinated) | Blending amount | 27 | | 25 | |
| | Polyolefin-based resin (A-2) (Chlorinated) | Blending amount | 0 | | 0 | |
| | Aqueous epoxy resin (B) | Blending amount | 30 | | 25 | |
| | Hydrophilicized-modified carbodiimide compound (C) | Type | C-1 | | C-1 | |
| | | Blending amount | 3 | | 10 | |

TABLE 1-continued

|  |  |  |  |  |
|---|---|---|---|---|
| | Aqueous polyurethane resin (D) | Type | D | D |
| | | Blending amount | 40 | 40 |
| | | Tg | −60 | −60 |
| | | Elongation at break | 610 | 610 |
| | Conductive black | PWC | 2 | 2 |
| | Total amount of resin solid content | | 100 | 100 |
| | Ratio [(C)/(D)] of hydrophilicized-modified carbodiimide compound (C)/aqueous polyurethane resin (D) | | 0.08 | 0.25 |
| Intermediate coating composition | | | Intermediate coating composition-1 | |
| Aqueous base coating composition | | | Aqueous base coating composition-1 | |
| Clear | | | Polyure Excel O-1200 | |
| Performance at 70° C. × 30 minutes | Moisture-resistant adhesion (number of peeled sections) | 0 | 0 | 0 | 0 |
| | Shrinkage after moisture resistance test | ○△ | ○△ | ○△ | ○△ |
| | Chipping resistance | 5 | — | 5 | — |
| Performance at 75° C. × 30 minutes | Moisture-resistant adhesion (number of peeled sections) | 0 | 0 | 0 | 0 |
| | Shrinkage after moisture resistance test | ○△ | ○△ | ○△ | ○△ |
| | Chipping resistance | 5 | — | 5 | — |
| Performance at 80° C. × 30 minutes | Moisture-resistant adhesion (number of peeled sections) | 0 | 0 | 0 | 0 |
| | Shrinkage after moisture resistance test | ○△ | ○△ | ○△ | ○△ |
| | Chipping resistance | 5 | — | 5 | — |

TABLE 2

| | | | Example 6 | | Example 7 | | Example 8 | |
|---|---|---|---|---|---|---|---|---|
| | | | On electro-deposition | On PP | On electro-deposition | On PP | On electro-deposition | On PP |
| Primer | Polyolefin-based resin (A-1) (Non-chlorinated) | Blending amount | 35 | | 21 | | 32 | |
| | Polyolefin-based resin (A-2) (Chlorinated) | Blending amount | 0 | | 0 | | 0 | |
| | Aqueous epoxy resin (B) | Blending amount | 30 | | 26 | | 33 | |
| | Hydrophilicized-modified carbodiimide compound (C) | Type | C-1 | | C-1 | | C-1 | |
| | | Blending amount | 5 | | 3 | | 10 | |
| | Aqueous polyurethane resin (D) | Type | D | | D | | D | |
| | | Blending amount | 30 | | 50 | | 25 | |
| | | Tg | −60 | | −60 | | −60 | |
| | | Elongation at break | 610 | | 610 | | 610 | |
| | Conductive black | PWC | 2 | | 2 | | 2 | |
| | Total amount of resin solid content | | 100 | | 100 | | 100 | |
| | Ratio [(C)/(D)] of hydrophilicized-modified carbodiimide compound (C)/aqueous polyurethane resin (D) | | 0.17 | | 0.06 | | 0.40 | |

TABLE 2-continued

|  |  | Intermediate coating composition | Intermediate coating composition-1 | | | | | |
|---|---|---|---|---|---|---|---|---|
|  |  | Aqueous base coating composition | Aqueous base coating composition-1 | | | | | |
|  |  | Clear | Polyure Excel O-1200 | | | | | |
| Performance at 70° C. × 30 minutes | Moisture-resistant adhesion (number of peeled sections) | | 0 | 0 | 0 | 0 | 0 | 0 |
|  | Shrinkage after moisture resistance test | | ○Δ | ○Δ | ○Δ | ○Δ | ○Δ | ○Δ |
|  | Chipping resistance | | 5 | — | 5 | — | 4 | — |
| Performance at 75° C. × 30 minutes | Moisture-resistant adhesion (number of peeled sections) | | 0 | 0 | 0 | 0 | 0 | 0 |
|  | Shrinkage after moisture resistance test | | ○Δ | ○Δ | ○ | ○ | ○Δ | ○Δ |
|  | Chipping resistance | | 5 | — | 5 | — | 4 | — |
| Performance at 80° C. × 30 minutes | Moisture-resistant adhesion (number of peeled sections) | | 0 | 0 | 0 | 0 | 0 | 0 |
|  | Shrinkage after moisture resistance test | | ○Δ | ○Δ | ○ | ○ | ○Δ | ○Δ |
|  | Chipping resistance | | 5 | — | 5 | — | 4 | — |

|  |  |  | Example 9 | | Example 10 | | Example 11 | |
|---|---|---|---|---|---|---|---|---|
|  |  |  | On electro-deposition | On PP | On electro-deposition | On PP | On electro-deposition | On PP |
| Primer | Polyolefin-based resin (A-1) (Non-chlorinated) | Blending amount | 25 | | 25 | | 0 | |
|  | Polyolefin-based resin (A-2) (Chlorinated) | Blending amount | 0 | | 0 | | 25 | |
|  | Aqueous epoxy resin (B) | Blending amount | 30 | | 30 | | 30 | |
|  | Hydrophilicized-modified carbodiimide compound (C) | Type | C-1 | | C-1 | | C-1 | |
|  |  | Blending amount | 5 | | 5 | | 5 | |
|  | Aqueous polyurethane resin (D) | Type | D | | D | | D | |
|  |  | Blending amount | 40 | | 40 | | 40 | |
|  |  | Tg | −60 | | −60 | | −60 | |
|  |  | Elongation at break | 610 | | 610 | | 610 | |
|  | Conductive black | PWC | 2 | | 2 | | 2 | |
|  | Total amount of resin solid content |  | 100 | | 100 | | 100 | |
|  | Ratio [(C)/(D)] of hydrophilicized-modified carbodiimide compound (C)/aqueous polyurethane resin (D) |  | 0.13 | | 0.13 | | 0.13 | |
| Intermediate coating composition |  |  | Intermediate coating composition-1 | | Intermediate coating composition-2 | | Intermediate coating composition-1 | |
| Aqueous base coating composition |  |  | Aqueous base coating composition-2 | | Aqueous base coating composition-2 | | Aqueous base coating composition-1 | |
| Clear |  |  | Polyure Excel O-1200 | | | | | |
| Performance at 70° C. × 30 minutes | Moisture-resistant adhesion (number of peeled sections) |  | 0 | 0 | 0 | 0 | 0 | 0 |
|  | Shrinkage after moisture resistance test |  | ○ | ○Δ | ○ | ○ | ○ | ○ |
|  | Chipping resistance |  | 5 | — | 5 | — | 5 | — |
| Performance at 75° C. × 30 minutes | Moisture-resistant adhesion (number of peeled sections) |  | 0 | 0 | 0 | 0 | 0 | 0 |
|  | Shrinkage after moisture resistance test |  | ○ | ○ | ○ | ○ | ○ | ○ |
|  | Chipping resistance |  | 5 | — | 5 | — | 5 | — |
| Performance at 80° C. × 30 minutes | Moisture-resistant adhesion (number of peeled sections) |  | 0 | 0 | 0 | 0 | 0 | 0 |
|  | Shrinkage after moisture resistance test |  | ○ | ○ | ○ | ○ | ○ | ○ |
|  | Chipping resistance |  | 5 | — | 5 | — | 5 | — |

TABLE 3

|  |  |  | Comparative Example 1 | | Comparative Example 2 | | Comparative Example 3 | | Comparative Example 4 | |
| --- | --- | --- | --- | --- | --- | --- | --- | --- | --- | --- |
|  |  |  | On electro-deposition | On PP | On electro-deposition | On PP | On electro-deposition | On PP | On electro-deposition | On PP |
| Primer | Polyolefin-based resin (A-1) (Non-chlorinated) | Blending amount | 30 | | 30 | | 30 | | 40 | |
|  | Polyolefin-based resin (A-2) (Chlorinated) | Blending amount | 0 | | 0 | | 0 | | 0 | |
|  | Aqueous epoxy resin (B) | Blending amount | 30 | | 30 | | 30 | | 40 | |
|  | Hydrophilicized-modified carbodiimide compound (C) | Type | — | | — | | — | | — | |
|  |  | Blending amount | 0 | | 0 | | 0 | | 0 | |
|  | Aqueous polyurethane resin (D) | Type | A | | B | | C | | D | |
|  |  | Blending amount | 40 | | 40 | | 40 | | 20 | |
|  |  | Tg | −10 | | −18 | | −60 | | −60 | |
|  |  | Elongation at break | 12 | | 130 | | 312 | | 610 | |
|  | Conductive black | PWC | 2 | | 2 | | 2 | | 2 | |
|  | Total amount of resin solid content |  | 100 | | 100 | | 100 | | 100 | |
|  | Ratio [(C)/(D)] of hydrophilicized-modified carbodiimide compound (C)/aqueous polyurethane resin (D) |  | 0 | | 0 | | 0 | | 0 | |
| Intermediate coating composition | | | Intermediate coating composition-1 | | | | | | | |
| Aqueous base coating composition | | | Aqueous base coating composition-1 | | | | | | | |
| Clear | | | Polyure Excel O-1200 | | | | | | | |
| Performance at 70° C. × 30 minutes | Moisture-resistant adhesion (number of peeled sections) | | 100 | 10 | 50 | 10 | 20 | 10 | 10 | 10 |
|  | Shrinkage after moisture resistance test | | X | X | X | X | X | X | Δ | Δ |
|  | Chipping resistance | | 3 | — | 4 | — | 4 | — | 5 | — |
| Performance at 75° C. × 30 minutes | Moisture-resistant adhesion (number of peeled sections) | | 70 | 0 | 50 | 0 | 20 | 0 | 10 | 0 |
|  | Shrinkage after moisture resistance test | | X | X | X | X | X | X | Δ | Δ |
|  | Chipping resistance | | 4 | — | 4 | — | 4 | — | 5 | — |
| Performance at 80° C. × 30 minutes | Moisture-resistant adhesion (number of peeled sections) | | 50 | 0 | 50 | 0 | 0 | 0 | 10 | 0 |
|  | Shrinkage after moisture resistance test | | Δ | Δ | ΔX | ΔX | Δ | Δ | Δ | Δ |
|  | Chipping resistance | | 4 | — | 4 | — | 4 | — | 5 | — |

As is clear from the evaluation results of Table 1 (the above table), the coating film formed from the primer coating composition containing the hydrophilicized-modified carbodiimide compound (C) exhibits good adhesion to both a steel plate and a resin member and also exhibits good water resistance. Moreover, as described above, the primer coating composition according to the present invention can form a coating film which exhibits good adhesion to both a steel plate and a resin member and exhibits good water resistance. Furthermore, the primer coating composition according to the present invention can form a coating film which is excellent in chipping resistance.

On the other hand, it is clear that the coating film formed from the primer coating composition containing no hydrophilicized-modified carbodiimide compound (C) according to the present invention is inferior to the primer coating composition of the present invention at least in adhesion and water resistance. Moreover, the coating film formed from the primer coating composition containing no hydrophilicized-modified carbodiimide compound (C) according to the present invention failed to have both moisture resistance and chipping resistance.

INDUSTRIAL APPLICABILITY

The primer coating composition of the present invention is advantageous in that a coating film is well formed therefrom even under heating conditions of low temperature conditions (e.g., heating conditions at 120° C. or less), so that a cured coating film having excellent coating film properties can be obtained. By use of the primer coating composition of the present invention, it is possible to obtain a coating film having excellent coating film properties (capable of exhibiting water resistance and good adhesion to both a steel plate and a resin member, etc.) under milder heating conditions. By performing coating using the primer

The invention claimed is:

1. A primer coating composition comprising:
an aqueous polyolefin-based resin (A);
an aqueous epoxy resin (B);
a hydrophilicized-modified carbodiimide compound (C); and
an aqueous polyurethane resin (D),
wherein
the aqueous polyolefin-based resin (A) comprises an aqueous polypropylene-based resin having a weight-average molecular weight of 50,000 to 200,000,
a content of the hydrophilicized-modified carbodiimide compound (C) is 3 to 10 parts by mass based on 100 parts by mass of the resin solid content of the primer coating composition, and
the hydrophilicized-modified carbodiimide compound (C) is a compound represented by a formula (I), (II) or (III) below:

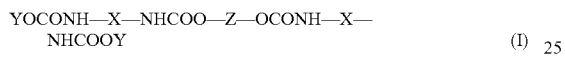
YOCONH—X—NHCOO—Z—OCONH—X—NHCOOY (I)

wherein Xs are each a bifunctional organic group having at least one carbodiimide group, Ys are identical or different structures each resulting from elimination of a hydroxyl group from a polyalkylene glycol monoalkyl ether, and Z is a structure resulting from elimination of a hydroxyl group from a bifunctional polyol having a number-average molecular weight of 200 to 5,000,

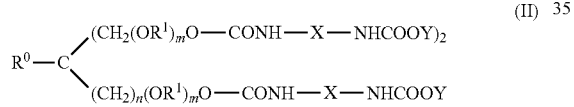

wherein Xs are each a bifunctional organic group having at least one carbodiimide group, Ys are identical or different structures each resulting from elimination of a hydroxyl group from a polyalkylene glycol monoalkyl ether, $R^0$ is hydrogen, a methyl group or an ethyl group, $R^1$ is an alkylene group having 4 or less carbon atoms, n is 0 or 1, and m is 0 to 60,

YOCONH—X—NHCOOY (III)

wherein X is a bifunctional organic group having at least one carbodiimide group, and Ys are identical or different structures each resulting from elimination of a hydroxyl group from a polyalkylene glycol monoalkyl ether.

2. The primer coating composition according to claim 1, wherein a content of the aqueous polyolefin-based resin (A) is 15 to 60 parts by mass based on 100 parts by mass of a resin solid content of the primer coating composition.

3. The primer coating composition according to claim 1, wherein the hydrophilicized-modified carbodiimide compound (C) represented by the formula (III) is a compound defined below:

YOCONH—X—NHCOOY (III)

wherein X is a bifunctional organic group having at least one carbodiimide group, and Ys are identical or different structures selected from (i) or (ii) below:
(i) a structure resulting from elimination of a hydroxyl group from a polyethylene glycol monoalkyl ether in which an alkyl group having 1 to 3 carbon atoms is ether-linked to an end of a polyethylene oxide unit having a repeat number of 6 to 20,
(ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60.

4. The primer coating composition according to claim 3, wherein
in the hydrophilicized-modified carbodiimide compound (C) represented by the formula (III), one Y is (i) and another Y is (ii), and
a ratio of the structure (i) to the structure (ii) is within a range of (i):(ii)=1:0.7 to 1:8.

5. The primer coating composition according to claim 1, wherein
the aqueous polyurethane resin (D) has a glass transition point (Tg) of −50° C. or less, and
a cured film of the aqueous polyurethane resin (D) has an elongation at break of 400% or more at −20° C.

6. The primer coating composition according to claim 1, wherein a content of the aqueous polyurethane resin (D) is 15 parts by mass or more based on 100 parts by mass of the resin solid content of the primer coating composition.

7. The primer coating composition according to claim 1, wherein the content of the aqueous polyurethane resin (D) is 25 parts by mass or more and 45 parts by mass or less based on 100 parts by mass of the resin solid content of the primer coating composition.

8. The primer coating composition according to claim 1, wherein a content of the aqueous epoxy resin (B) is 20 parts by mass or more and 50 parts by mass or less based on 100 parts by mass of the resin solid content of the primer coating composition.

9. A method for forming a coating film, the method comprising a step of applying the primer coating composition according to claim 1 to an object to be coated, and heating the primer coating composition to 70° C. to 120° C. to form a primer coating film.

10. The method for forming a coating film according to claim 9, further comprising a step of forming at least one coating film selected from an intermediate coating film, a base coating film and a clear coating film on the primer coating film.

11. The method for forming a coating film according to claim 9, wherein the object to be coated comprises a steel plate part and a resin part.

* * * * *